(12) United States Patent
Sirton et al.

(10) Patent No.: US 9,026,615 B1
(45) Date of Patent: May 5, 2015

(54) METHOD AND APPARATUS FOR CACHING IMAGE DATA TRANSMITTED OVER A LOSSY NETWORK

(75) Inventors: Guy Sirton, Delta (CA); William John Dall, New Westminster (CA)

(73) Assignee: Teradici Corporation, Burnaby, British Columbia (CA)

( * ) Notice: Subject to any disclaimer, the term of this patent is extended or adjusted under 35 U.S.C. 154(b) by 171 days.

(21) Appl. No.: 13/603,925

(22) Filed: Sep. 5, 2012

Related U.S. Application Data

(60) Provisional application No. 61/537,648, filed on Sep. 22, 2011.

(51) Int. Cl.
*G06F 15/16* (2006.01)
*H04L 29/06* (2006.01)

(52) U.S. Cl.
CPC ................................. *H04L 65/60* (2013.01)

(58) Field of Classification Search
CPC .............. H04N 5/232; H04N 5/23222; H04N 5/23293; H04N 19/00072; H04N 19/00169; H04N 19/00175
USPC ................................... 709/217; 345/520, 557
See application file for complete search history.

(56) References Cited

U.S. PATENT DOCUMENTS

| | | | |
|---|---|---|---|
| 5,559,952 A * | 9/1996 | Fujimoto | 345/557 |
| 7,012,612 B1 | 3/2006 | O'Neill et al. | |
| 7,747,821 B1 | 6/2010 | Singh et al. | |
| 8,520,734 B1 * | 8/2013 | Xu | 375/240.16 |
| 2002/0063717 A1 * | 5/2002 | Minner et al. | 345/557 |
| 2003/0093568 A1 | 5/2003 | Deshpande | |
| 2003/0177172 A1 | 9/2003 | Duursma et al. | |
| 2004/0008214 A1 | 1/2004 | O'Neill et al. | |
| 2005/0074174 A1 * | 4/2005 | Ishikawa | 382/232 |
| 2007/0195211 A1 * | 8/2007 | Fujimori | 349/5 |
| 2010/0053353 A1 * | 3/2010 | Hunter et al. | 348/222.1 |
| 2010/0281051 A1 | 11/2010 | Sheffi et al. | |
| 2012/0001832 A1 * | 1/2012 | Braghis et al. | 345/2.2 |
| 2012/0005630 A1 * | 1/2012 | Ohba et al. | 715/853 |
| 2012/0218277 A1 * | 8/2012 | Matilla et al. | 345/520 |
| 2013/0022123 A1 * | 1/2013 | Ueda et al. | 375/240.16 |

OTHER PUBLICATIONS

Vankeirsbilck, B.; Simoens, P.; De Wachter, J.; Deboosere, L.; De Turck, F.; Dhoedt, B.; Demeester, P.; , "Bandwidth Optimization for Mobile Thin Client Computing through Graphical Update Caching," Telecommunication Networks and Applications Conference, 2008. ATNAC 2008. Australasian , vol., no., pp. 385-390, Dec. 7-10, 2008 doi: 10.1109/ATNAC.2008.4783355.

* cited by examiner

*Primary Examiner* — Tesfay Yohannes
(74) *Attorney, Agent, or Firm* — Moser Taboada

(57) ABSTRACT

A method and apparatus for communicating image data. In one embodiment, the method comprises transmitting, by a computer comprising at least one processor, (i) an initial encoding of a first image instance of a first spatial tile in a sequence of image frames followed by (ii) an initial encoding of a second image instance of the first spatial tile; transmitting, by the computer, an encoding indicative of a perfect match between pixel values of a first image instance of a second spatial tile in the sequence and the first image instance of the first spatial tile; and transmitting, by the computer, an initial encoding of a second image instance of the second spatial tile based on receiving an indication of an absence of a decoding of the encoding of the first image instance of the first spatial tile.

15 Claims, 12 Drawing Sheets

METHOD AND APPARATUS FOR CACHING IMAGE DATA TRANSMITTED OVER A LOSSY NETWORK

CROSS-REFERENCE TO RELATED APPLICATIONS

This application claims benefit of U.S. provisional patent application Ser. No. 61/537,648, filed Sep. 22, 2011, which is herein incorporated in its entirety by reference.

BACKGROUND OF THE INVENTION

Field of the Invention

Embodiments of the present invention generally relate to apparatus and methods for compressing and communicating a visual image from a host computer to a client computer remotely located from the host computer.

SUMMARY OF THE INVENTION

Embodiments of the present invention generally relate to a method and apparatus for communicating image data between a first computer and a second computer, the first computer adapted for remotely coupling to the second computer via a network. In one embodiment, the method comprises transmitting, by a computer comprising at least one processor, (i) an initial encoding of a first image instance of a first spatial tile in a sequence of image frames followed by (ii) an initial encoding of a second image instance of the first spatial tile; transmitting, by the computer, an encoding indicative of a perfect match between pixel values of a first image instance of a second spatial tile in the sequence and the first image instance of the first spatial tile; and transmitting, by the computer, an initial encoding of a second image instance of the second spatial tile based on receiving an indication of an absence of a decoding of the encoding of the first image instance of the first spatial tile.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
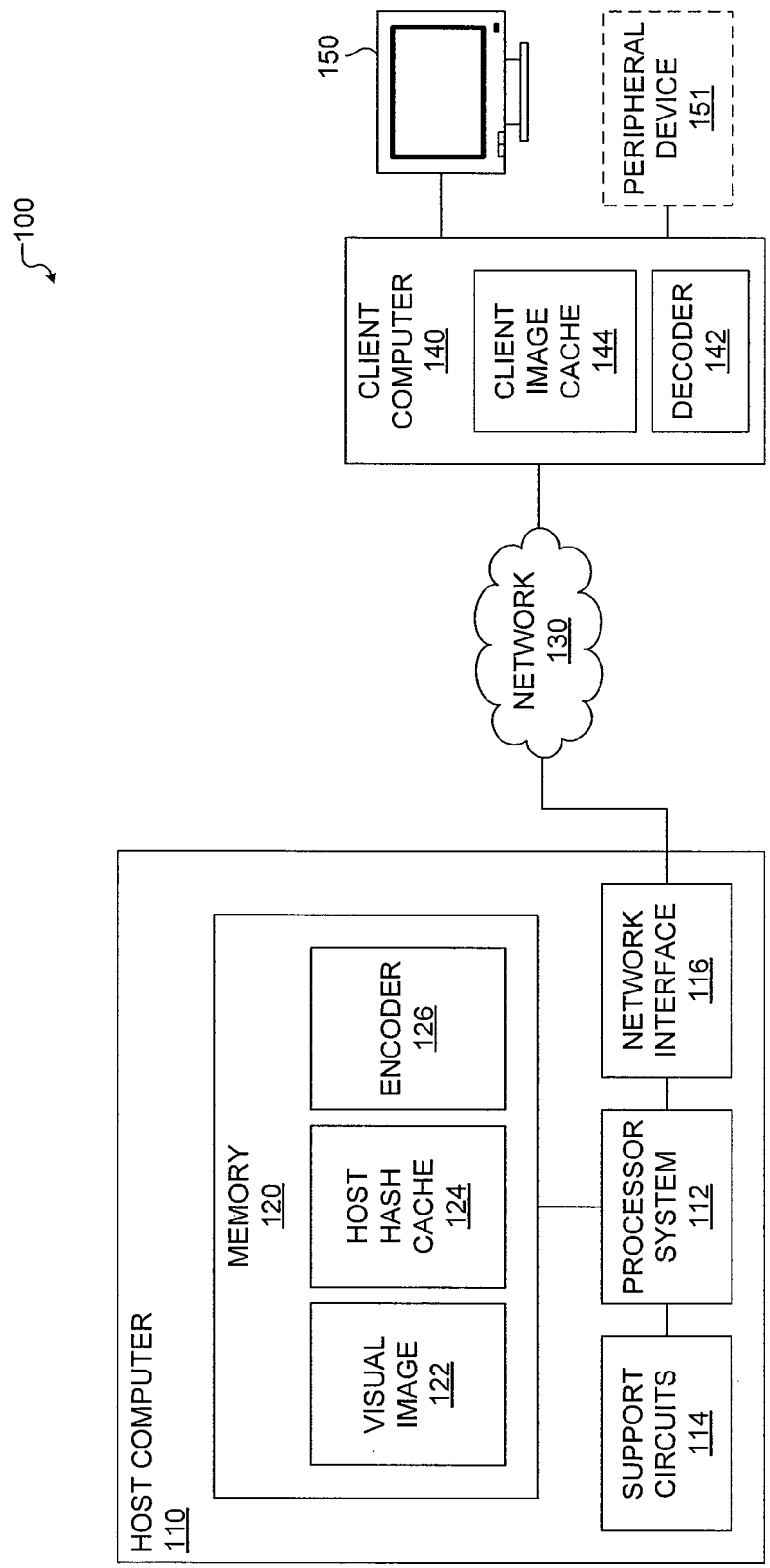
FIG. 1 is a block diagram depicting select details of a host computer in a system in accordance with one or more embodiments of the present invention.

The term processor as used herein refers to any type of processor, CPU, microprocessor, microcontroller, embedded processor, media processor, graphics processor, any other programmable device capable of executing and/or interpreting instructions in a form of software (such as microcode, firmware and/or programs), or any locally coupled combination of one or more of these processing elements.

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term 'cache hash table' as used herein references a means for storing and managing a set of values associated with a section of an image by providing a mapping between a hash value of each section, the section herein generally referenced as an 'image tile' or 'tile', and information associated with the tile, including tile state and reference information. There are well known methods of calculating hash values, such as MD-5 and SHA-1.

The term 'host computer' as used herein references a processing system, connected to a computer network, comprising a processor to execute software to render an image. In an embodiment, the host computer is a desktop computer, server computer, virtual machine, notebook, notepad or phone.

The term 'client computer' as used herein references a processing system, connected the host computer by a computer network, comprising a processor to present an image decoded from data received over the computer network. In an embodiment, the client computer is a desktop computer, thin client, monitor, TV, notebook, notepad or phone. In an embodiment, the client computer has a human input interface, operationally coupled to the host computer to control software on the host computer.

Embodiments of the present invention disclose a system and method for providing image compression using a dynamic cache hash table. The dynamic cache hash table provides fast, lossy or lossless image processing suitable for compression of high frame rate image streams with repeating content, such as dynamic computer display image representations that require a relatively high quality output image representation as compared with conventional color quantized images. The present invention may be applied to a variety of image compression applications; in some embodiments, the disclosed methods are applied to real-time remote display applications in which a host computer comprising the source image stream is connected to a remote client computer, the remote client computer having a display device, by a computer network.

In such remote display embodiments, the host computer comprises a processor system with an encoder and data structures including a source visual image and a cache hash table. The encoder uses methods described herein to systematically encode changed regions of the source visual image based on availability of resources and timing. Encoded pixel data and references to previously encoded pixel data, determined using the cache hash table and communicated to the remote client computer where a corresponding client cache table is maintained. A decoder at the remote client computer recovers the compressed image (by decoding the encoded pixel data or retrieving image tiles from the client image cache), which is then presented on a display as a visual approximation of the source visual image. Encoding and decoding table update rules, in combination with communicated information, are used in maintaining the cache hash table and the client image cache. In an embodiment, decoded pixel data is selectively added to the client cache table based on indications communicated to the client computer by the host computer.

In an embodiment, a section of the source visual image (referred to as an image tile), such as a block (e.g., 4×4 pixels or 8×8 pixels), a macroblock (e.g., 16×16 pixels), or a rectangle (generally comprising an integer number of adjacent macroblocks, e.g., 32×32 pixels) is retrieved, a hash value for that image tile is calculated, and that hash value is compared to a set of hash values in the cache hash table at the host. If the hash value for the image tile matches one of the hash values of the cache hash table, a client reference code is determined or retrieved from the host cache and encoded, and the cache hash table is re-indexed to reflect the recent match. If the hash value for the tile does not match any of the hash values in the cache hash table, the pixel color values are encoded and a new hash value entry is inserted in the table. In an embodiment, indexing and the re-indexing are used to determine which cache entry to discard to enter a new hash values into the cache hash table.

FIG. 1 is a block diagram depicting select details of a remote display system 100 in accordance with one or more embodiments of the present invention. The remote display system 100 ("system 100") comprises host computer 110 coupled to a remote client computer 140 by network 130. In an embodiment, host computer 110 includes hardware elements, such as processor system 112, network interface 116, memory 120 and support circuits 114, in addition to software encoder 126 and data structures, such as visual image 122 (i.e., a source visual image) and host hash cache 124 in memory 120. FIG. 1 portrays only one of numerous possible network configurations. For example, in some embodiments, system 100 comprises several remote client computers, each associated with different domains of host computer 110. In other embodiments, system 100 comprises more than one processor system 112. For simplicity and clarity, only one processor system 112, and only one remote client computer 140 are depicted and described. Embodiments of the invention, as shall be discussed below, include a method for encoding visual image 122 for communication to remote client computer 140, where the received encoded image is decoded and presented for display on display apparatus 150.

Network 130 comprises a communication system, such as the Internet, LAN, WAN, or the like, that connects computer systems completely by wire, cable, fiber optic, and/or wireless links facilitated by various types of well-known network elements, such as connection brokers, Network Address Translation (NAT) routers, gateways, hubs, switches, firewalls, and the like. The network 130 may employ various well-known protocols, such as security protocols, to communicate information amongst the network resources. The network 130 may employ various well-known standards, such as Ethernet or Internet Protocol (IP).

Host computer 110 is, generally, a computer or system of computers that has been designated for generating and encoding visual images. In an exemplary embodiment, host computer 110 executes operating system software, drivers, application software, and visual image encoding software in one or more operating system domains. In such an embodiment, the operating system typically comprises a well known operating system, such as a WINDOWS operating system from MICROSOFT Inc., an OSX operating system from APPLE Inc., or a LINUX or UNIX operating system available from many vendors. The operating system is typically supported by well known graphics drivers enabled to generate and maintain visual image 122. Examples of such graphics drivers include OPENGL from SILICON GRAPHICS corporation, DIRECTX from MICROSOFT CORPORATION, or image composition software, such as the WINDOWS VISTA Desktop Windows Manager (DWM) or QUARTZ from APPLE CORPORATION. In an embodiment, the visual image is directly or indirectly rendered by application software executing on a processor of the host computer 110. In an embodiment, the application software responds to human input events from a peripheral device of the remote client computer 140.

In some embodiments, several operating systems are executed within the host computer 110 as virtual machines (VMs) under supervision of a hypervisor, where the hypervisor coordinates the execution schedule and manages memory resources of each VM. Examples of commercially available hypervisor products include VMWARE ESX SERVER from VMWARE Corporation, XENSERVER from CITRIX Corporation, HYPER-V from MICROSOFT Corporation, and products such as the VIRTUAL IRON Hypervisor based on open source XEN source code. In other embodiments, multiple users control the rendering of user-dependent visual images in a Remote Desktop Services (RDS) or Terminal Services environment.

Application software of host computer 110 generally comprises one or more executable applications with image display presentation or storage requirements, such as word processing software, spreadsheets, email, web browser, financial data presentation, video or photo display or editing software, graphics software (such as Computer Aided Design (CAD) software), Desktop Publishing (DTP) software, digital signage software, or the like. Such applications generate or retrieve (from memory 120) graphical information in the form of pixel data, graphics commands, video information, and the like. For example, host computer 110 may execute multimedia applications, such as ITUNES or QUICKTIME from APPLE CORPORATION, WINDOWS MEDIA PLAYER from MICROSOFT CORPORATION, and/or utility applications, that provide visual image 122 for presentation on display apparatus 150. In an embodiment, CAD software executing on the host computer 110 and operating under control of a peripheral device at the remote client computer 140 renders the visual image 122 from information accessed over the computer network 130.

Processor system 112 is generally a processor designated to execute the encoding functions provided by encoder 126 for compressing visual image 122. In one set of embodiments, processor system 112 comprises industry compliant Central Processing Unit (CPU) and/or Graphic Processing Unit (GPU) resources typically supported by north bridge, south bridge, and/or other chipset components known to the art. Examples of a well-known suitable CPU include mobile, workstation, or server class processors, such as 32-bit, 64-bit or other CPUs, including OPTERON, ATHLON, or PHENOM class microprocessors manufactured by AMD Corporation, XEON, PERYN, PENTIUM, or X86 class processors manufactured by INTEL, ARMv7 or ARMv8 architecture processors from ARM, and SPARC or PowerPC microprocessors manufactured by SUN MICROSYSTEMS Inc. and Motorola, respectively. Suitable GPUs include integrated or external graphics processors, such as RADEON class GPUs from AMD Corporation, GEFORCE or QUADRO class GPUs from NVIDIA Corporation, or similar GPU processors provided by corporations such as Imagination Technologies, ARM, INTEL or VIA Corporation. FIG. 1 portrays only one variation of many possible configurations of processor system 112. In some embodiments, processor system 112 comprises multiple CPU cores or separate CPUs, for example, interconnected by PCI-EXPRESS infrastructure, a HYPERTRANSPORT fabric, or the like, with memory 120 distributed accordingly.

Processor system 112 is coupled to memory 120 by one or more memory buses and/or system buses. In an embodiment, memory 120 comprises any one or combination of volatile computer readable media (e.g., random access memory (RAM), such as dynamic RAM (DRAM), static RAM (SRAM), eXtreme Data Rate (XDR) RAM, Double Data Rate (DDR) RAM, and the like) and nonvolatile computer readable media (e.g., read only memory (ROM), hard drive, tape, CDROM, DVDROM, magneto-optical disks, erasable programmable read only memory (EPROM), electrically erasable programmable read only memory (EEPROM), Flash EPROM, and the like). Moreover, memory 120 may incorporate electronic, magnetic, optical, and/or other types of storage media. In an exemplary embodiment, the memory 120 stores executable software, including encoder 126, in the form of machine-readable instructions and various data structures, including visual image 122 and host hash cache 124, in the form of designated memory regions, typically allocated by operating system and application software functions.

Visual image 122 comprises a set of pixel data, such as Red, Green, Blue (RGB), Cyan, Magenta, Yellow and Key black (CYMK) or chrominance-luminance (YUV) pixel data, typically ordered in raster or block sequence located in one or more regions of memory 120 that have been designated for the storage of such pixel data. In other embodiments visual image data 122 may include subsampled image data in formats such as 4:2:0. Other embodiments may also include additional pixel information with the visual data, such as alpha channel data. In all such embodiments, visual image 122 represents at least part of a computer desktop display image, including part or all of application-related images such as photographs, video sequences, web browser interfaces, or productivity software Graphical User Interfaces (GUIs) (e.g., word processor, database, spreadsheet, and the like). In some cases, visual image 122 is distributed as multiple logical entities across non-contiguous memory, such as front and back frame buffers, multiple display windows where each window corresponds to a separate display of a multi-display system, or independent visual images generated by different virtual machines. In another embodiment, visual image 122 corresponds to only part of an image presented at the remote client computer 140 as other parts may be generated from alternative sources or host computers.

In various remote desktop display applications, software and graphics drivers dynamically update parts of visual image 122 with pixel values changes, for example responsive to user interaction where the user provides input at the remote client computer 140. In some such embodiments, memory 120 comprises a binary mask (i.e., 'dirty mask') for tracking the location of pixels, or groups of pixels, that have changed subsequent to a previous encoding iteration. Such a mask enables encoder 126 to selectively encode portions of visual image 122 without requiring scanning or encoding the complete image, resulting in reduced processor and/or network bandwidth consumption.

Figure 7:
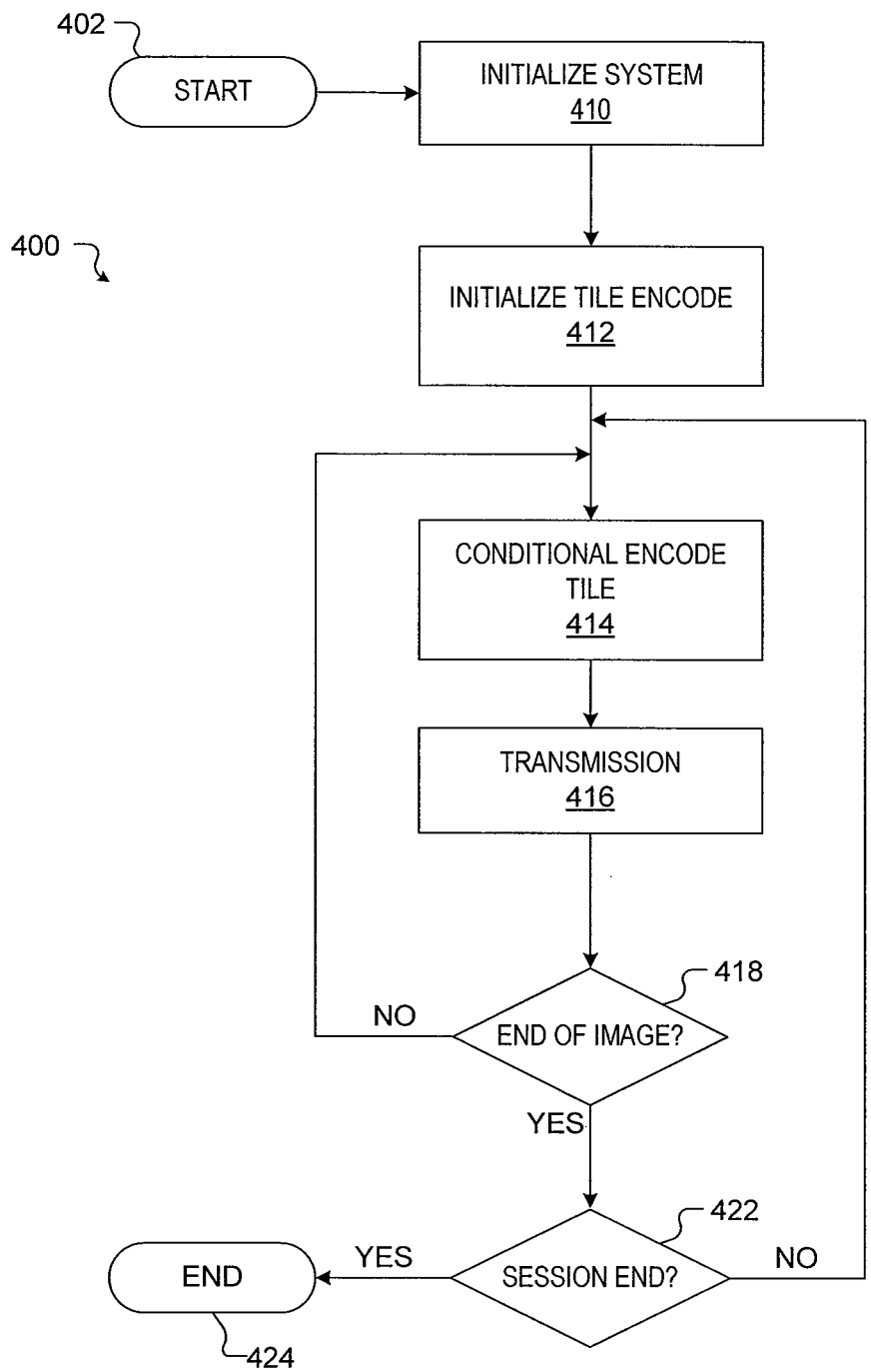
FIG. 7 is a block diagram of a method for encoding and transmitting a visual image sequence in accordance with one or more embodiments of the present invention.
Figure 12:
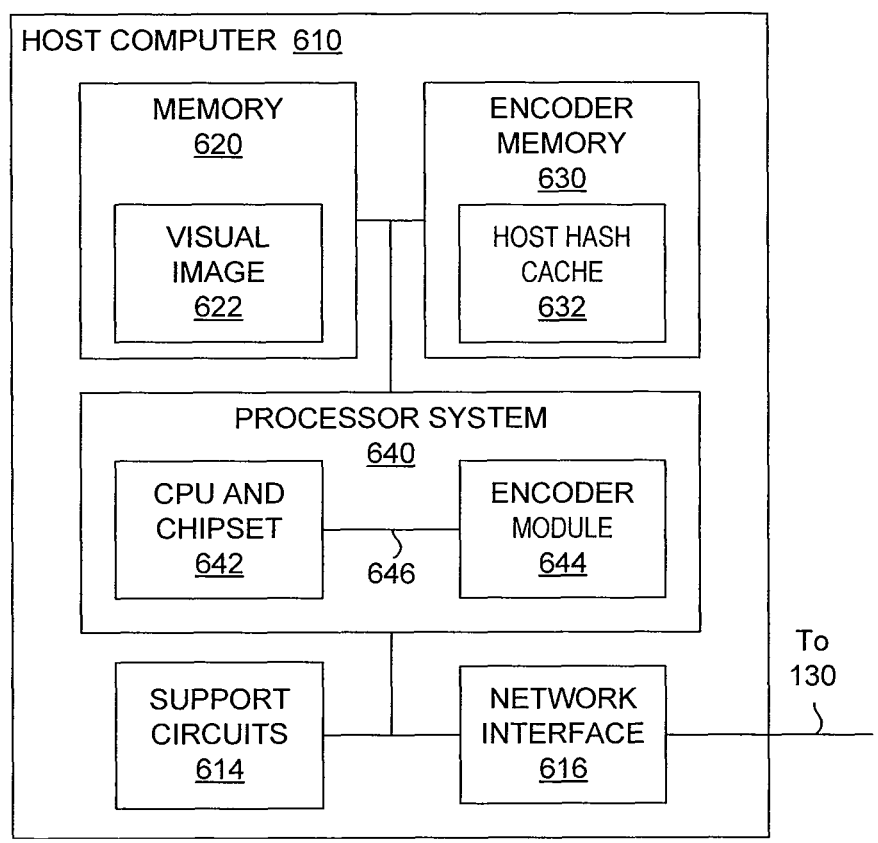
FIG. 12 illustrates select details of an alternative embodiment of a host computer comprising an encoding module.
Figure 13:
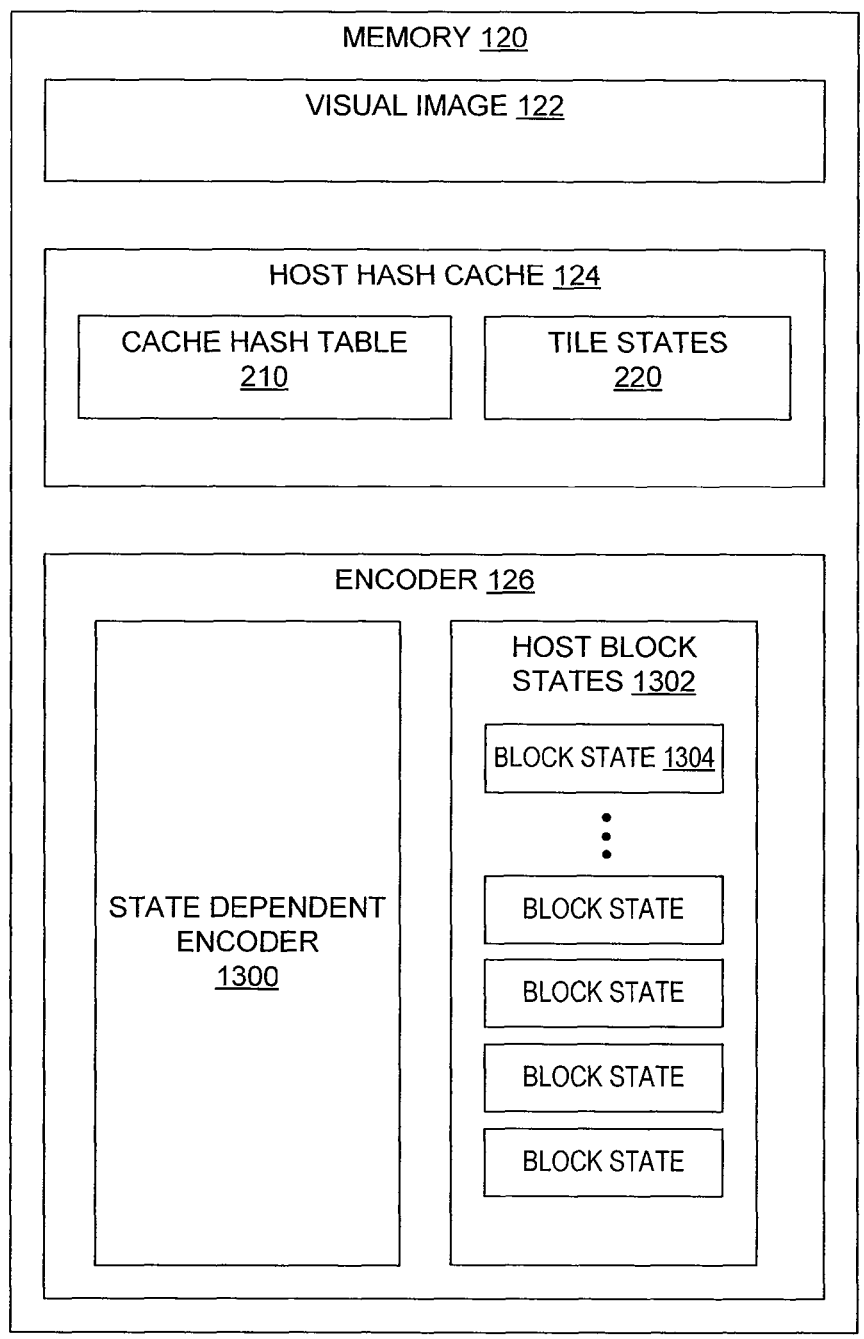
FIG. 13 is a block diagram of the host computer memory in accordance with one or more embodiments of the present invention.

Encoder 126 comprises a set of functions for compressing visual image 122 into encoded pixel data in conjunction with the caching methods described by the present disclosure. Such compression functions include lossy compression techniques e.g., wavelet or Discrete Cosine Transform (DCT) known to the art in addition to functions for providing lossless encoding, such as Golomb exponential, Golomb-Rice, LZ, LZW, Zip, RLE or arithmetic encoding functions. In an embodiment, encoder 126 comprises a set of machine executable instructions that are accessed and executed by processor system 112. In other embodiments, processor system 112 includes hardware features to implement, assist or accelerate the encoding. The encoder 126 generally reduces the network bandwidth associated with encoded pixel data by encoding areas of visual image 122 that have been determined to have changed since a previous encoding cycle. During each encoding cycle, suitably dimensioned sets of pixels associated with the changed areas (such as 16×16 macroblocks) are accessed and encoded by applying the lossy and/or lossless compression functions to generate the encoded pixel data. Select details of such an encoding process are depicted in FIG. 7 and described below. Select details of an alternative host computer comprising an independent co-processing encoder module are depicted in FIG. 12. In some embodiments, encoding image sections that are changed and are not referenced in the host hash cache 124, includes using encoding methods, such as text, picture, solid background, lossy or lossless encoding, which may be determined by analyzing the image data. The analysis includes at least one of determining repeat color counts or determining contrast levels of the image sections. Select details of an encoder 126 for state-dependent encoding are depicted in FIG. 13 and described further below.

Figure 2:
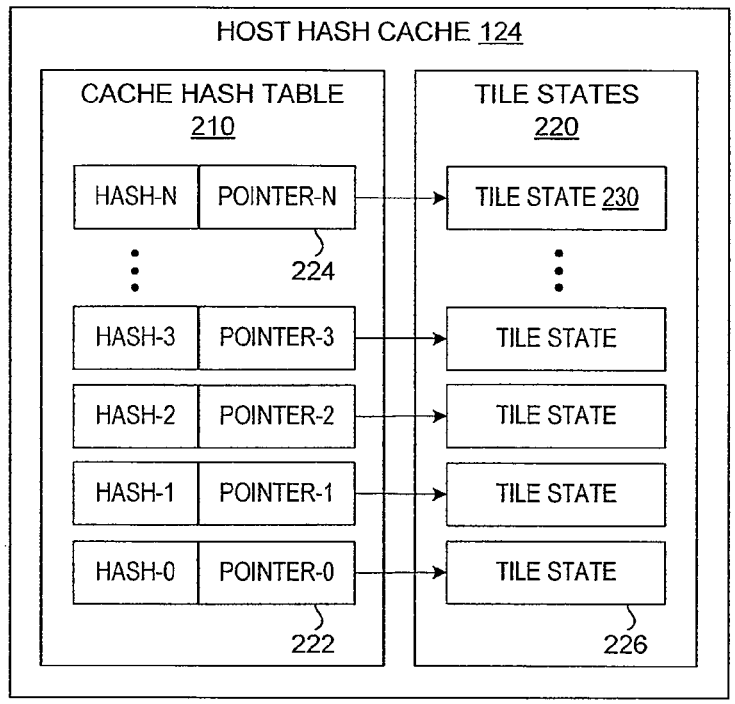
FIG. 2 depicts details of a host hash cache table in accordance with one or more embodiments of the present invention.

Host hash cache 124 generally comprises an ordered list of hash values and tile state information associated with recently encoded tiles of visual image 122. An example of host hash cache 124 is depicted in FIG. 2 and described below.

Once these recently encoded tiles have been encoded and their hash values and state information stored, the current image data of the visual image 122 is only required to determine the next changes to the visual image 122. All historic image data from the visual image 122 is discarded after the updates to the visual image 122 are detected. As will be described in detail in following sections, the encoder 126 determines all repeated and cached image content by comparing hash values of previously encoded tiles and uses tile state information to identify image references stored at the remote client computer 140. Discarding the historic image data allows the cache system to operate with minimal memory requirements on the host computer 110.

In various embodiments, host computer 110 comprises network interface 116 for providing connectivity to network 130. Network interface 116 comprises physical layer elements, such as data transceivers and higher layer protocol functions, for maintaining a network connection with remote client computer 140. Network interface 116 may utilize network services in the form of software functions stored in memory 120 for providing protocol support, such as UDP/IP, TCP/IP and security functions. In alternative embodiments, higher layer protocol functions are provided by software executing in the processor system 112.

In various embodiments, processor system 112 and memory 120 are coupled with the aid of support circuits 114. Such support circuits 114 may include power supplies, clock circuits, data registers, I/O interfaces address, control, interrupt and/or data connections, controllers, data buffers, drivers, repeaters, and/or receivers to enable appropriate communications within host computer 110. In some embodiments, support circuits 114 incorporate hardware-based virtualization management features, such as emulated register sets, address translation tables, interrupt tables, PCI I/O virtualization (IOV) features, or I/O memory management unit (IOMMU), to enable Direct Memory Access (DMA) operations between processor system 112 and memory 120. In some embodiments, parts or all of blocks of the host computer 110 may be integrated into common silicon devices; such as a System on Chip (SoC) device with associated interconnect structures.

Figure 4:
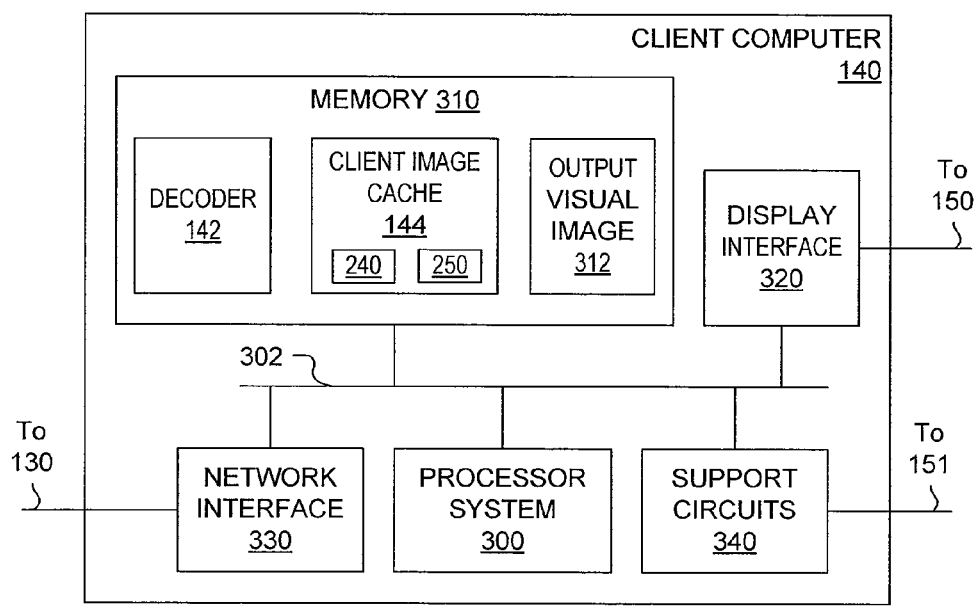
FIG. 4 is a block diagram depicting select details of a client system in accordance with one or more embodiments of the present invention.

Remote client computer 140 is, generally, a computing device enabled to provide remote display functions, such as presenting a computer desktop image for display, providing ports for connecting display 150, and providing a network interface for connection to network 130. For example, in an embodiment, remote client computer 140 is a terminal in a networked computer system (e.g., remote display system 100). Examples of such remote terminals include thin client or zero client computers, intelligent displays or tablet computers, personal computers, notebook computers, workstations, Personal Digital Assistants (PDAs), wireless devices, and the like. Remote client computer 140 comprises decoder 142 which operates in conjunction with client image cache 144 to decode compressed display image data received from the host computer 110, generally associated with a remote display session. Select details of an embodiment of remote client computer 140 are depicted in FIG. 4.

According to various embodiments, display 150 is coupled to remote client computer 140 by a suitable cable and display image protocol, such as Video Graphics Array (VGA), Digital Visual Interface (DVI), or DISPLAYPORT. In an embodiment, display 150 is one or more of a Liquid Crystal Display (LCD) display, a Cathode Ray Tube (CRT) display, a plasma display, projector, and/or any other type of display capable of displaying one or more images. For example, in some embodiments, display 150 is a Widescreen Ultra eXtended Graphics Array (WUXGA) display supporting a resolution of 1920×1200. In some embodiments, remote client computer 140 is coupled to several displays to provide an extended desktop surface, or embedded in a display 150 to reduce the remote client computer footprint. It will be appreciated by those of ordinary skill in the art that host computer 110 and remote client computer 140 generally comprise mechanical housing components, connectors, power supplies, and the like not depicted in FIG. 1.

In an embodiment, remote client computer 140 includes a peripheral device 151 for human input. Events from the peripheral device 151 are communicated by the client computer 140 to the host computer 110, where software executing on the processor system 112 renders image content in the visual image 122 in response to the events. The rendered image content is then encoded by the processor system 112, communicated over the network 130, decoded by the decoder 142 and displayed on display 150. In this way images rendered by the host computer 110 are present to a user at the remote client computer 140 in response to user input at the remote client computer 140.

FIG. 2 depicts details of a host hash cache 124 in accordance with one or more embodiments of the present invention. Host hash cache 124 generally comprises a set of tile hash values generated from a selection of tiles from recently encoded visual images 122. The number of recently encoded tiles referenced by the host hash cache 124 will generally depend on the available memory to store images at the remote client computer 140. Generally the storage will support multiple display frames worth of unique image tiles. Specifically, cache hash table 210 comprises an ordered list of hash values (i.e., HASH-0, HASH-1, . . . HASH-N) and associated pointers (i.e., POINTER-0, POINTER-1, . . . POINTER-N) that point to a set of states of recently encoded tiles ('tile states' 220). In an embodiment, tile states 220 record information about recently entered tiles, including tile quality, delay state, lossless state and client reference code. In an embodiment, the tile states 220 of host hash cache 124 are ordered on a Least Recently Used (LRU) basis with the first index 222 (i.e., POINTER-0) pointing to state information (i.e., tile state 226) of the most recently used tile, and the last index 224 (i.e., POINTER-N) pointing to state information (i.e., tile state 230) for the least recently used tile. In another embodiment, tile states 220 are ordered according to statistical attributes such as how often a tile is detected, the time elapsed since the most recent detection and bandwidth required for transmitting a recoding of the tile. Such statistics enable the host computer 110 to maintain a larger number of hash values (and associated statistics), improve the cache hit ratio and improve the bandwidth savings of a cache hit. In another embodiment, at least part of host hash cache 124 is maintained after the termination of a remote computing session which enables improved decision making (e.g., initialization of the host hash cache 124 or priming of statistical parameters) for a subsequent remote computing session.

Figure 3:
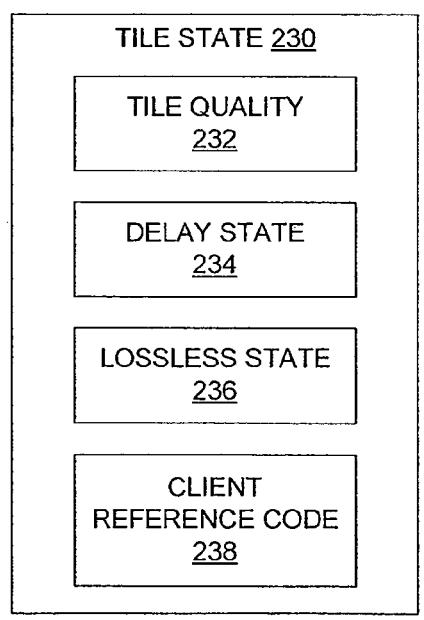
FIG. 3 depicts details of a tile state entry in the host hash cache table in accordance with one or more embodiments of the present invention.

FIG. 3 depicts a typical tile state 230 which comprises encoder state information relating to the associated cached tile. Specifically, tile quality 232 specifies the lossy quality level of the associated image section previously sent to remote client computer 140, such as a level in the range of 1 to 100 corresponding with the JPEG image quality scale Q1 through Q100. Delay state 234 records information about the time that has passed since the image section was previously sent to remote client computer 140 (e.g. number of milliseconds elapsed since the image was sent which is used by the host computer 110 to progressively enhance an image from lossy to lossless over a period time). Lossless state 236 indicates whether the image previously sent to remote client computer 140 is at a lossless image quality level. In an embodiment, tile state 230 comprises any tile-related information useful by an encoder (e.g., encoder 126) that performs progressive, refinement, replacement or any state dependent encoding of an image, such as tile state dependent encoding. Such tile-related information may include pixel masks or blocking structures for sub-dividing the tile with associated individual sub-portion states or other information, image type information of parts or all of the tile, sequence timing of completed progressive or refinement encodings or neighbor tile information.

In general, the encoder 126 and decoder 142 of the system 100 divide the image frame into a number of spatially partitioned tiles (or blocks, regions or any other spatial partition of the frame), where a tile has matching encoding and decoding states which are independent of other tiles of the image frame. For example, a progressively building encoder allows a small changed area within an image frame to go through a sequence of build encodings to a lossless state, without having to recode areas of the image frame that have not changed and are already in a losslessly encoded state. In this environment, when a tile of an image changes, it is encoded to an initial state, where an encoder tile-specific state (described below with respect to FIG. 13) is maintained by the encoder 126. At the same time, a corresponding hash value is entered into the host hash cache 124 along with a copy of the encoder tile-specific state (e.g., copied to tile quality 232). In this way, when the image of the tile is seen again at a different temporal and/or spatial location within the image stream and is referenced by the encoder 126 using the client reference code 238, the encoder 126 copies the associated tile quality 232 into the encoder tile-specific state of the tile associated with the different location. As described below, the client decoder 142 is synchronized with the host encoder 126 and will have a complimentary copy of the quality in the image cache 144 that it will copy with a cached tile, keeping the quality of the decoded cached tile synchronized between the encoder 126 and the decoder 142. In an embodiment supporting progressive build updates of cached images, tiles of the frame buffer that are in the host hash cache 124 have their tile state 230 updated as the tile image and its associated tile-specific encoded state are updated. Similarly, the client computer 140 would also update the client image cache 144 to keep the host hash cache 124 synchronized to the client image cache 144.

Client reference code 238 is the information that host computer 110 communicates to reference a tile previously sent to remote client computer 140. In some embodiments the client reference code 238 is a combination of the frame number and frame location of the previously communicated image, which remote client computer 140 uses to find the correct image section being referenced. In an embodiment, the client reference code 238 also identifies a display number of a multi-display client computer. In other embodiments, the client reference code 238 uses other methods to selectively identify previously encoded and communicated tiles. In general, the client reference code 238 is any number, name or structure usable to correlate tile images on the host computer 110 with tile images cached at the remote client computer 140. The client reference code 238 provides sufficient structure to detect references to stale, lost or discarded references at the remote client computer 140.

In one or more embodiments, entries in the host hash cache 124 are accessed using a binary tree search. Other access methods are also possible, such as a hash lookup of the hash values. Similarly, if an encoding of a tile is updated without a change to the associated image pixel data, as with progressive build encoding, host hash cache entries are also accessed and updated (e.g., to reflect a new build state) using the hash code of the respective tile.

In one or more embodiments of a host computer 110, the tile state 230 maintains information required to synchronize with the remote client computer 140. For example, if a section of the image was previously encoded using a lossless encoder and is referred to using a client reference code 238, both remote client computer 140 and host computer 110 will know the reference is to a lossless image and will not need to be enhanced over time. If the section of the image was previously encoded using a lossy encoder (for example JPEG as known in the art) using a low lossy quality (for example JPEG Q30 as known in the art), the host computer 110 may over time re-encode the image using higher quality (for example JPEG Q80 as known in the art); or if the section was encoded with a progressive encoder transmitting successive layers of data (for example JPEG2000 as known in the art) the remote client computer 140 and host computer 110 will remain synchronized as to the current quality of said image section. Furthermore, after a certain time elapses the host computer 110 may resend the image using a lossless encoder to bring the client display to a lossless state. In these embodiments the tile quality 232, the delay state 234 and the lossless state 236 are used to support a progressive image build or refinement and lossless replace or build process. The information within the tiles states 220 is specific to each tile of the image. In some of these embodiments, indexing of the host hash cache entry to obtain or update this tile state information is performed using the hash value for the tile.

In some embodiments, the dimensions of host hash cache 124 (i.e., number of entries in cache hash table 210 or the maximum memory size) is programmable to enable customization of the host hash cache 124 according to computer memory availability at the remote client computer 140 or host computer 110.

FIG. 4 illustrates select details of an embodiment of a remote client computer 140. Remote client computer 140 comprises processor system 300, memory 310, display interface 320, network interface 330, and support circuits 340 communicatively coupled by bus 302. It will be appreciated by those of ordinary skill in the art that in an embodiment such as a thin client or desktop PC, remote client computer 140 may further comprise mechanical housing components, connectors, power supplies, and the like not illustrated in FIG. 4. Remote client computer 140 may be implemented, at least in part, as a processor, a computer system, and/or a programming or a processing environment configured to receive, decode, and display cached image data, such as encoded sections from a sequence of image frames or image regions. Remote client computer 140 may also include one or more of Human Interface Devices (HIDs); peripheral components, such as microphones or speakers; other interfaces, such as a USB interface; and other components, interfaces, and/or connections associated with computer systems, desktop computers, and/or processors. In various embodiments, remote client computer 140 is a processing module integrated in an appliance, such as a phone or a display apparatus. In some such embedded implementations, remote client computer 140 may be configured to use resources, such as power supply and mechanical support components, provided by the related appliance.

According to various embodiments, bus 302 is one or more of a Peripheral Component Interconnect (PCI) bus; a PCI-EXPRESS bus; an Advanced Microprocessor Bus Architecture (AMBA®) bus; and any other connections, including wired, wireless, and optical connections, for coupling components of remote client computer 140. In some embodiments, bus 302 includes communications elements, such as controllers, data buffers and/or registers, drivers, repeaters, receivers, and connections including address, control, and data connections, to enable communications among components of remote client computer 140. According to various embodiments, bus 302 is one or more of a single bus; a plurality of independent busses, with some of the components of remote client computer 140 coupled to more than one of the independent buses; a plurality of bridged busses; a fabric, and any other one or more busses configured to couple the components of remote client computer 140.

Processor system 300 is a microprocessor, microcontroller, or logic sequencer enabled to provide control and/or management functions for remote client computer 140 and further enabled to execute image decoding and display functions. Examples of processor system 300 include 16-bit, 32-bit, or 64-bit CPUs from manufacturers such as INTEL, AMD, or VIA Technologies; and any other suitable processor or computing device, such as a MIPS or ARM embedded processor suited to Application Specific Integrated Circuit (ASIC), Field Programmable Gate Array (FPGA) or programmable digital media processor implementations of remote client computer 140. Such ASIC or FPGA implementations may be configured, at least in part, as a logic circuit and/or software executing on and/or in conjunction with a processor to perform image decoding techniques of decoder 142. In other embodiments, processor system 300 executes local application software and generates additional display images to be combined with the decoded output visual image 312. Such local application software may include, but is not limited to, on screen display (including overlays) of local information, local HTML browser content, an operating system supporting a window for the output visual image 312, or other software loaded and executed on the remote client computer 140. In still other embodiments, the additional display images are decoded from additional sessions with other host computers or servers.

Memory 310 comprises random access memory, read only memory, removable disk memory, flash memory such as one or more of electronic, magnetic, optical, and/or other types of storage media; volatile computer-readable media, such as RAM, DRAM, SRAM, DDR RAM or XDR RAM; and non-volatile computer-readable media, such as ROM, hard drive, tape, CDROM, DVDROM, magneto-optical disks, EPROM, EEPROM, Flash EPROM, or various combinations of these types of memory for storing data and/or computer-readable instructions. Memory 310 stores various software, firmware, and/or data structures including decoder 142, client image cache 144, and output visual image 312. In some embodiments, memory 310 further comprises operating system software components, bus drivers, device drivers, and the like. In various embodiments, memory 310 is partitioned and/or distributed. For example, in some embodiments, memory 310 is partitioned into a plurality of partitions, such as system and frame buffer partitions, and the frame buffer partition is accessible by display interface 320. In some embodiments, memory 310 uses different busses for coupling with network interface 330, processor system 300, display interface 320, and/or other components of remote client computer 140, and includes control logic for arbitrating access to memory 310 among the components of remote client computer 140.

In various embodiments, display interface 320 obtains output visual image 312 from memory 310, and provides a display signal, such as a raster signal, for display 150 using a suitable display signaling protocol. In some DVI embodiments, display interface 320 includes line driver circuitry, such as Transition-Minimized Differential Signaling (TMDS) circuitry. In other embodiments, display interface 320 includes one or more VGA or DISPLAYPORT controllers and uses alternative display protocols, such as DISPLAYPORT, Digital Packet Video Link (DPVL), High-Definition Multimedia Interface (HDMI), or the like. In some embodiments the display interface 320 also supports multiple displays using multiple connectors or methods to combine multiple display images on a single connector. In other embodiments, audio data may be combined with the display signal or communicated over the same connector. Audio data may be generated by the host computer 110 as a separate stream, but is communicated in synchronization with the communication of the visual image 122 from the host computer 110 to the remote client computer 140.

Network interface 330 generally receives an encoded image stream from host computer 110 for decoding and presentation. In one embodiment, the network interface 330 provides compatibility with the network 130 by executing a reliable communication protocol, such as TCP/IP, or an unreliable communication protocol, such as UDP/IP, and a security services, such as Advanced Encryption Standard (AES) encryption. In some embodiments, communication protocols are supported by the client processor system 300. Support circuits 340 include at least one of power supplies, clock circuits, data registers, I/O interfaces, network interfaces, and the like. The support circuits 340 support the functionality of processor 300, bus 302, memory 310, display interface 320, network interface 330, and other components of remote client computer 140. In some embodiments, support circuits 340 provide interfaces to at least one peripheral device 151 normally found at a remote client computer 140 including, but not limited to, keyboard, mouse, printer, storage and audio devices. In some embodiments, the interface to the peripheral device 151 is a USB port supported by the processor system 300 to bridge USB communications with the host processor system 112.

Figure 8:
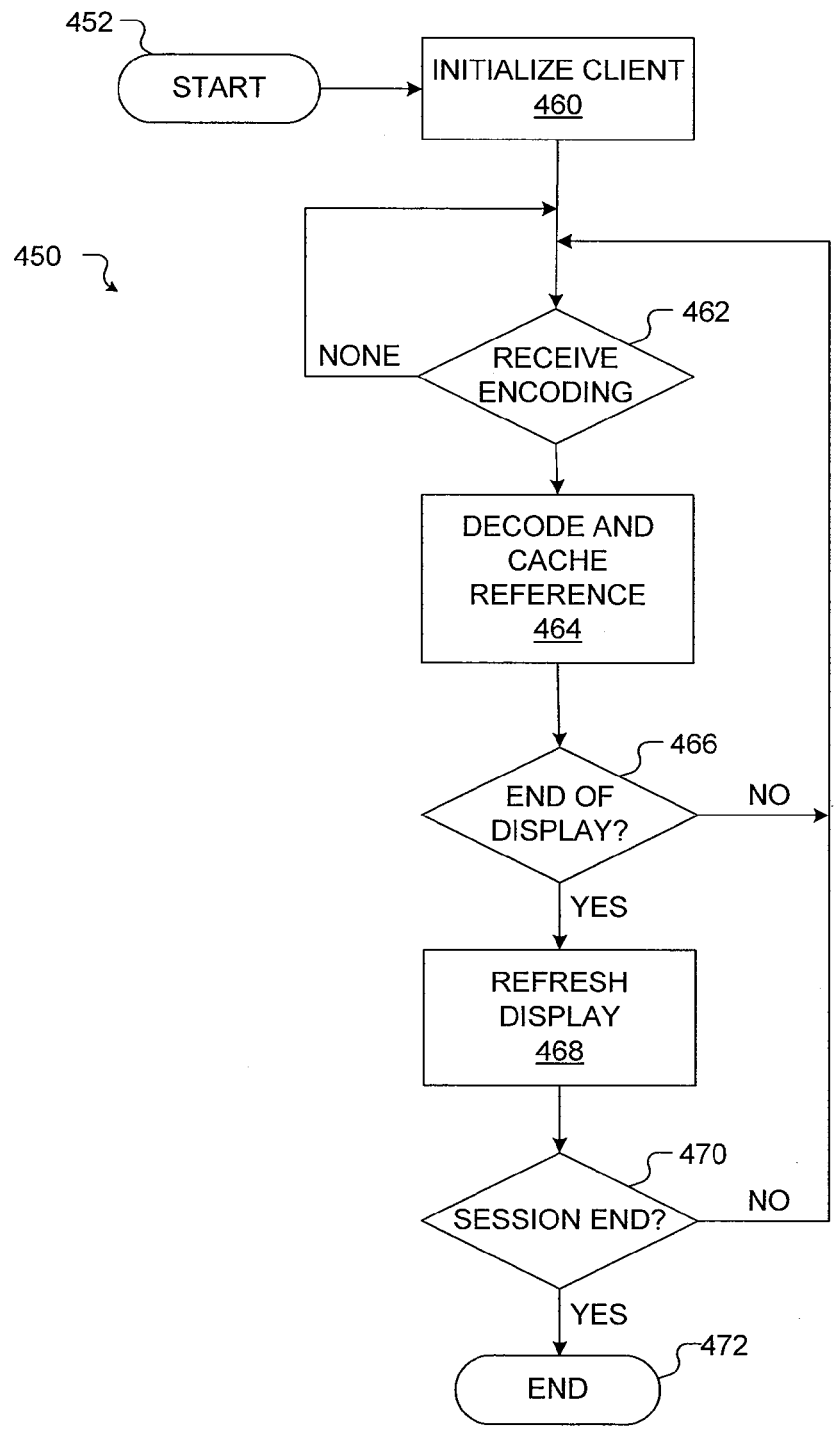
FIG. 8 is a block diagram of a method for decoding and displaying the transmitted visual image sequence, in accordance with one or more embodiments of the present invention.

Decoder 142 comprises functions for decompressing encoded image data received from host computer 110 and generating output visual image 312 using client image cache table 144 in conjunction with image cache decoding methods, an embodiment of which is depicted as method 450 in FIG. 8. In an embodiment, decoder 142 comprises a set of machine executable instructions that are retrieved from memory and executed by processor system 300.

Figure 5:
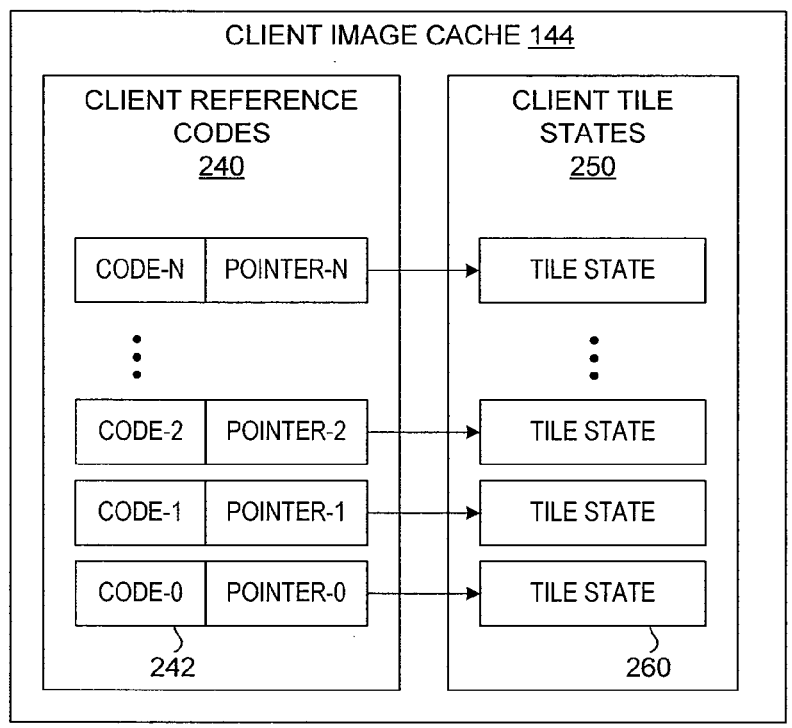
FIG. 5 depicts details of a client image cache table in accordance with one or more embodiments of the present invention.

Client image cache 144 generally comprises an ordered list of client tile states 250 referenced by a set (i.e., a list) of client reference codes 240, described in detail below with respect to FIG. 5. The client tile states 250 in client image cache 144 are associated with current or previous sections (i.e., tiles) of the output visual image 312. In an embodiment, such a list of client reference codes 240 comprises a set of reference codes where each code is associated with a tile state in the list of client tile states 250. Output visual image 312 comprises a set of pixel data, representing an approximation of the source visual image 122, stored in a format such as RGB, YUV, or CMYK in one or more regions of memory 310, such as one or more frame buffers associated with one or more display devices.

In some embodiments, various combinations of all or portions of functions performed by a computer (such as computers 110 or 140), and portions of a processor, a microprocessor, or a programmable controller providing all or portions of the aforementioned functions, are specified by descriptions compatible with processing by a computer system (e.g., Verilog, VHDL, or any similar hardware description language). In various embodiments, the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

FIG. 5 depicts details of a client image cache 144 in accordance with one or more embodiments of the present invention. Client image cache 144 generally comprises a set of client reference codes 240 referring to recently changed or referenced sections (i.e., tiles) of the output visual image 312. Specifically, client reference codes 240 comprise an ordered list of client reference codes (i.e., CODE-0, CODE-1, ... CODE-N) and associated pointers (i.e., POINTER-0, POINTER-1, ..., POINTER-N) that point to a set of states of recently changed or referenced tiles ("client tile states" 250). In an embodiment, client reference code 238 identifies the encoded frame and tile position in the encoded frame that is indexed and pointed to by an associated hash value of the cache hash table 210. On the client side, i.e., at the client computer 140, the client reference codes identify the matching decoded frame and tile position of a previously decoded image frame. In an embodiment, each tile state (ref. client tile state 260) records information about a recently recalled or recently changed tile, including tile quality, delay state, lossless state and tile pixel values as described below with respect to FIG. 6. In an embodiment, the client tile states 250 of client image cache 144 are ordered on a Least Recently Used (LRU) basis with the first index (i.e., POINTER-0) pointing to state information of the most recently used tile and the last index (i.e., POINTER-N) pointing to state information for the least recently used tile.

Figure 6:
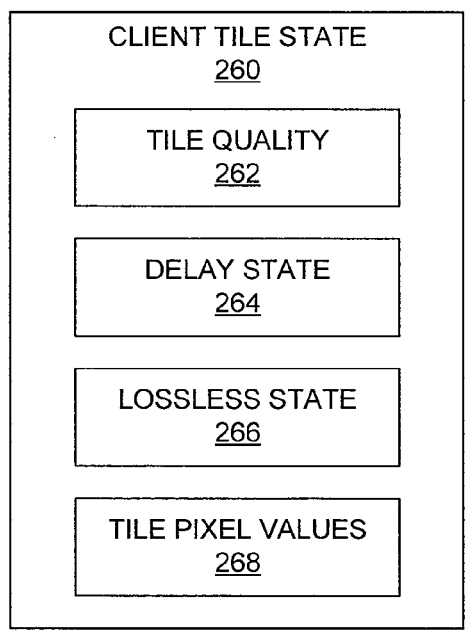
FIG. 6 depicts details of a tile state entry in the image cache table in the client computer in accordance with one or more embodiments of the present invention.

FIG. 6 is a block diagram of an exemplary client tile state 260. In one or more embodiments, client tile state 260 may comprise tile quality 262 storing the lossy image quality level. In some embodiments client tile state 260 further comprises delay state 264 storing a copy of the host delay state 234. In some embodiments, client tile state 260 further comprises lossless state 266 indicating whether the tile is an approximation or an exact match of a previously encoded tile from source visual image 122. In an embodiment, tile quality 262, delay state 264 and lossless state 266 make up a client tile-specific decode state which is matched to a host tile-specific encode state of tile quality 232, delay state 234 and lossless state 236. Other embodiments may use different data to represent a quality level, or the tile-specific encode state, of the associated decoded pixel data. For example, a single value representing a sequence of build states from initial to lossless, with or without a temporal or delay state indication, may be used. In general the encoder 126 and decoder 142 are dependent on the respective encode or decode state of each tile. The purpose of the tile states 220 and client tile states 250 is to ensure the state of each tile remains synchronized between the host computer 110 and client computer 140 when a cached image tile is used.

Client tile state 260 further comprises tile pixel values 268, or pointers to tile pixel values stored in the client image cache 144, comprising a set of pixel data recently seen in the output visual image 312. The storage format of tile pixel values 268 may be chosen in order to optimize usage of memory 310. In an embodiment, pixel data encoded as lossless (i.e., using a lossless encoding algorithm) is stored in RGB format only. If progressive encoding of pixel values is in progress, pixel values may be stored in YUV format (in which case the progressive decoder or display interface 320 provides translation to RGB format). In some embodiments, RGB pixel values are stored in conjunction with quality increments (delta values) in YUV format which enables translation from RGB to YUV by applying colour space conversion and then adding the delta values. The objective of such approaches is to minimize storage, support different encoding methods and minimize CPU complexity (and/or cost) associated with processor system 300. E.g., output visual image 312 can be directly updated by tile pixel values 268 if the pixel values are represented in RGB format; YUV values require translation to RGB before display. In some embodiments, tile pixel values 268 are compressed (e.g. using lossless encoding such as the RFC 1951 'deflate' algorithm) for additional memory savings. Compression ratio for tile pixel values 268 may be improved by grouping similar tiles. In other embodiments, the decoder 142 transforms or maintains the stored image into or in the frequency domain to support progressive decoding (e.g., progressive build or progressive refinement) using layers of frequency domain transformed coefficients of the tile pixel values.

In various embodiments in which memory 310 is partitioned into regions of varying accessibility (e.g. an L2 cache, located on a hard drive or flash storage), less frequently used tiles may be stored in slower/less accessible memory. In some embodiments, such cached tiles may persist between remote computing sessions. In some such embodiments, cached tiles may be compressed, lossy or losslessly with matching changes to state information, to reduce storage requirements. In other such embodiments, cached image data persisting between remote computer sessions is encrypted and can only be decrypted by a key retained by the host computer 110 or some other secure location such as a broker. If the remote client computer 140 reconnects to the same host computer session, the cache (i.e., client image cache 144) can be decrypted by the key stored on the host computer 110 and initial images are encoded more efficiently allowing a faster session reconnect. If the remote client computer 140 is used to connect to an alternative host computer 110 or the host computer session is ended, the key is lost and the host and client caches (i.e., host hash cache 124 and client image cache 144) are re-initialized at the start of the host/client session.

In an embodiment, the host hash cache 124 and the client image cache 144 are allocated and maintained at a sufficient size to store multiple frames of historic tiles. As such, an encoding of a tile of a frame of an image sequence can selectively reference a tile of one of multiple frames to find a tile match resulting in improved compression. This is an improvement of single reference encoding methods that restrict the encoding of a tile to a single frame reference and do not support individual tile reference addressing which include spatial and temporal information (e.g., client reference code 238).

FIG. 7 is a block diagram of a method 400 executed by host computer 110 for encoding and transmitting a visual image sequence in accordance with one or more embodiments of the present invention. Method 400 starts at step 402 ("Start") and proceeds to step 410 ("Initialize System"). In an embodiment, a host computer (e.g. host computer 110) is initialized and secure communication with remote client computer 140 is established. Encoder 126 is initialized and visual image 122 is generated in memory 120. Generally, visual image 122 continues to be updated by processor system 112 by computational processes independent of the method 400. Encoder 126 instantiates host hash cache 124 to an empty state, which in an embodiment includes allocating the size of the host hash cache 124 based on determining available memory for, or size of, client image cache 144.

The method 400 proceeds to step 412 ("Initialize Tile Encode"). In an embodiment the tile states 220 are initialized to an empty table. In an alternative embodiment the tile states 220 and cache hash table 210 are initialized to default states or to values saved from a previous session with the remote client computer 140. Encoder 126 obtains an image section (e.g., one or more tiles) from host visual image 122. In various embodiments, the order or timing of image section selection is based on factors such as time elapsed since the image section has changed or last encoded, encoding priority information (for example, related to image type information or user interaction), raster scan sequence, characteristics of communicating encodings of the host visual image 122, or the like. In some embodiments, 'dirty mask' techniques known to the art are used to prevent unnecessary redundant retrieval, alternative image change analysis, re-encoding, or the retransmission of unchanged sections of visual image 122. In an embodiment, unchanged sections or portions of sections that have not been encoded to a lossless state are selected for encoding based on their lossless state (as maintained within the encoder 126) indicating a refinement or lossless encode or recode requirement. In other embodiments, visual image 122 is decomposed into various image types (such as picture image comprising natural images with multiple different colors, background image comprising a portion of pixels with the exact same colour, text image comprising high contrast pixels over a background image, high contrast image types comprising unnatural contrast or coloring, and the like) prior to encoding such that different encoding methods and parameters can be used when encoding the different image types.

The method 400 proceeds to step 414 ("Conditional Encode Tile"), where a hash of an image tile (i.e., input pixel values of the tile) in the obtained image section is calculated and compared to the hash values in cache hash table 210 of host hash cache 124. The hash is calculated using a hashing algorithm such as MD-5 or SHA-1 known to the art. The hashing algorithm is chosen such that a match in hash values (i.e., cache hit) can be assumed to represent a perfect match of between pixel values of the image tile and a cached image tile at the client. The pixel values are encoded according to whether a table hit (i.e., a cache match) or a table miss (cache miss) is determined, producing encoded pixel data or an encoding of the associated client reference code 238 according to the outcome of the comparison. In an embodiment, after encoding the pixel values and using the pixel values to detect a change in a subsequent frame, the pixel values of the section are discarded, by freeing the associated memory of visual image 122 for reuse, as pixel values are not required for future cache hits and subsequent encoding operations. An embodiment of such a comparison and encoding method is depicted as the method 500 in FIG. 9.

The method 400 proceeds to step 416 ("Transmission"), where the encoded pixel data or an encoding of the client reference code 238 from step 414 (generally stored in memory 120) are communicated to the remote client computer 140, typically maintaining the encoded pixel data order used in step 414 for the table comparison. Various embodiments will handle the transmission step 416 differently, In general, there is an encoded information structure for the encoded data that is known to the encoder 126 and decoder 142 and does not need to be explicitly communicated. In an embodiment, the encoded information structure may identify a slice of a frame being updated by the encoded data. The information structure may then identify which portions, tiles or blocks of the slice are being updated and which remain unchanged. The structure may further identify what type of encoding or codec was used on each portion, tile or block. In some embodiments, this encoded information structure is compressed using a context adaptive binary arithmetic coder (CABAC) or some other lossless encoder to minimize the size of the information needed to be transmitted. Other embodiments may have more or less pre-configured structures used to minimize the partitioning and identification overhead of communicating block-level image encoding. The encoded pixel data may be queued for later transmission, which enables data associated with multiple encoded pixels to be aggregated in network packets and reduces overheads associated with block reference information and packet headers. In some embodiments, encoded slices or portions of a frame of the host visual image 122 are aggregated and managed as a unit by the image communication system (e.g., tiles may be grouped together as a slice). In other embodiments, encoded pixel data is handled separately from the encoded client reference code 238, thus allowing encoded pixel data to be used at the remote client computer 140 even if there is an error in the cached-referenced image portions. In some embodiments, encoding comprises aggregating data from multiple sections of the host visual image 122 to perform inter-section encoding (e.g., entropy encoding of predictive cache references based on previous cache references).

As a next step 418 ("End of Image?"), method 400 determines if the last tile in the current image or image section has been processed. If not, the method 400 returns to step 414 and the next input tile of the section is evaluated for potential encoding. If at step 418 it is determined that encoding of the current image is complete, the method 400 proceeds to step 422 ("Session End?"), where the method 400 determines if the method 400 should be terminated, for example on termination of a connection between the host computer 110 and the remote client computer 140 (in which case the method 400 ends at step 424 ("End")), or if additional encoding is required, for example if the host visual image 122 is updated, in which case a next section of the host visual image 122 is obtained and the method 400 returns to step 414 to process the next section. Other embodiments may support multiple images, as might be required for multiple displays, multiple applications or multiple users, and loop through portions of the multiple images.

In some embodiments, returning from "end of image?" step 418 or "session end?" step 422 to "conditional encode tile" step 414 includes cleanup of the host hash cache 124 (for example to prevent aliasing of historic client reference codes 238 or image reference IDs used in the tile states 220).

In some embodiments, using a common host hash cache 124 for multiple users allows cache content to be shared with multiple remote client computers 140. This requires the remote client computers 140 to share their cached content (client image cache 144).

FIG. 8 is a block diagram of a method 450 executed by the remote client computer 140 for displaying pixel data determined from transmitted encoded pixel data or transmitted encoded client reference codes in accordance with one or more embodiments of the present invention. Method 450 starts at step 452 ("Start") and proceeds to step 460 ("Initialize Client"). In an embodiment, remote client computer 140 is initialized and communications with host computer 110 is established. Processor system 300 initializes decoder 142. Output visual image 312 in memory 310 is initialized, for example by loading a local splash screen image from memory 310. Client image cache 144 is instantiated and initialized to correspond with the initialized state of the host hash cache 124 of the host computer 110, which may include combinations of empty cache contents, default cache contents or cache contents of a previous session.

Method 450 proceeds to step 462 ("Receive Encoding?"), where non-cached encoded pixel data (e.g., block DCT coefficients) and encoded client reference codes (i.e. encodings of client reference codes 238) are extracted from one or more network packets received from host computer 110. If no new image data is available at the host computer 110 for encoding, and hence no encodings received at the remote client computer 140, method 450 returns to step 462. In an embodiment such as method 550 depicted in FIG. 10 and described below, the received network packet comprises, as determined by encoder 126, either encoded pixel data or an encoding of a client reference code 238 pointing to existing pixel values 268 in an image cache entry in client image cache 144.

Method 450 proceeds to step 464 ("Decode and Cache Reference") where pixel values for a section of the output visual image 312 are derived from at least one of encoded image data or a referenced tile. In an embodiment, a set of pixel values of one or more tiles having existing client image cache references (for example, a tile that has an existing reference in the client image cache 144 and has been re-encoded at the host computer 110 to a higher quality level) are extracted from encoded image data using decoding steps complementary to encoding operations specified for step 414 of the method 400. Alternatively, decoder 142 uses decoded client reference codes to reference and extract previously stored tiles (ref. tile pixel values 268) and additional tile state information (tile quality 262, delay state 264, and/or lossless state 266) from client image cache 144. The tile pixel values 268 extracted from the client image cache 144, or the set of pixel values decoded from the network packet, are stored at encoding-identified locations of output visual image 312. Tile pixel values decoded from the network packet, along with corresponding tile state information, are also generally stored in the client image cache 144 as a new cache entry. Client image cache 144 is updated such that ordering of represented client reference codes 240 and client tile states 250 reflect the represented ordering of hash values and tile states in host hash cache 124, for example, according to an LRU sorting algorithm corresponding to a matching sorting algorithm deployed at the host computer. Table ordering is generally updated each time a new image tile is encountered. In some embodiments the host computer 110 will indicate that one or more portions of the image should not be cached (e.g. in the case that a region of visual image 122 has been identified as comprising rapidly changing video content) in which case client image cache 144 is not updated for those portions.

In some embodiments with the LRU sorting algorithm, the most-recent client tile state 260 is either re-located to the lowest entry position (most recently used) in the client image cache 144 from elsewhere in the table, or, if newly received and decoded, posted at the lowest entry position in the client image cache 144 (in which case the least recently used tile is purged from the client image cache 144).

In an embodiment, client image cache 144 is list-linked in LRU order to determine next available cache location for a decoded tile, and indexed in client reference code order to enable the decoder 142 to access the cached content.

Method 450 proceeds to step 466 ("End of Display?"), where in some embodiments it is determined if a decoding of an encoded output visual image update is complete and if the latest output visual image 312 should be displayed. If additional decoding of the encoded output visual image update is required, method 450 returns to step 462. If a display update cycle is required, method 450 proceeds to step 468 where display 150 is refreshed with the output image updated copied to the output visual image 312.

Method 450 proceeds to step 470 ("Session End?"), where it is determined if method 450 should be terminated, for example, on completion of a remote display session, and in which case method 450 ends at step 472 ("End"). If additional decoding and display steps are required, method 450 returns to step 462 to process additional encoded image data. In some embodiments, "session end" decision 470 may occur asynchronously to the decoding or displaying of the output visual image 312. In other embodiments the output visual image 312 is used to refresh the display 150 where the display 150 is asynchronous to the decoded updates to the image. Other embodiments display the output visual image 312 directly and control the decoding updates to be synchronized with the display refresh.

Figure 9:
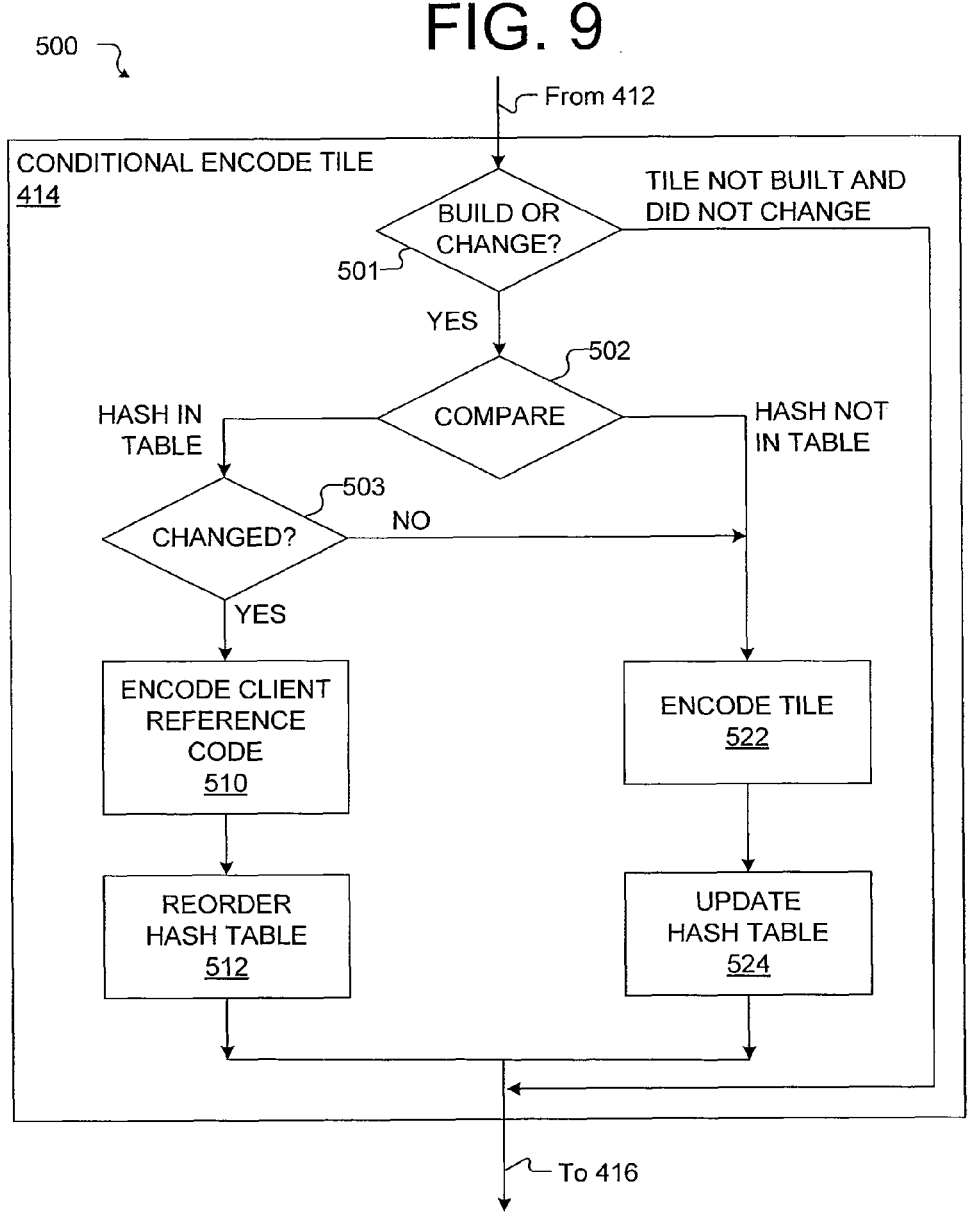
FIG. 9 is a block diagrams of a method for conditionally encoding a tile in accordance with one or more embodiments of the present invention.

FIG. 9 is a block diagram of a method 500 for encoding a tile of visual image 122 comprising comparing a hash value of the tile of visual image 122 to hash values of an image cache table. The method 500 illustrates an embodiment of step 414 in FIG. 7 ("Conditional Encode Tile"). Method 500 starts, subsequent to step 412 of the method 400, at step 501 ("Build or Change?") where it is determined if the tile is to be encoded as a result of a change in visual image 122 or if the tile is to be encoded as a result of an unchanged image tile that is to be encoded at a higher quality.

If, at step 501, it is determined that the tile has not changed and does not require encoding at a higher quality (e.g., if insufficient time has elapsed since previous encoding or the image is at a lossless state, as determined from delay state information maintained by the encoder 126), method 500 proceeds to step 416 of the method 400. Otherwise the method 500 proceeds to step 502 ("Compare").

At the next step 502 of method 500 ("Compare"), a hash value of the tile to be encoded is compared to the hash values in cache hash table 210 of host hash cache 124. In an embodiment comparing is performed by a binary search tree structure maintained as each hash value is added or removed from the host hash cache 124.

If, at step 502, it is determined that the tile hash value matches one of the hash values in cache hash table 210 (i.e., if a cache hit is determined), method 500 proceeds to step 503 ("Changed?").

If, at step 503, it is determined that the input pixels associated with the tile have changed from the previous encoded image frame (e.g., as might occur when a tile reverts to a previously displayed image that remains cached in client image cache 144), method 500 proceeds to step 510 ("Encode client reference code") at which the client reference code 238 (i.e., of tile state 230) associated with the input pixels is encoded. In an embodiment, the client reference code 238 is encoded using a lossless encoding technique, such as Golomb exponential encoding, Golomb-Rice encoding, or by a predictive encoder followed by an entropy encoder such as a context adaptive arithmetic encoder, or an alternative suitable entropy encoding method. In other embodiments other methods of referencing the cached images at the remote client computer 140 may be used such as sequence numbering. In some embodiments, the encoding technique and/or encoder predictions are changed to suit the observed distribution of cache hits. In an embodiment, the client reference code 238 identifies the location of a matching tile by the tile's frame number or timing within a historic sequence of frames, in combination with the spatial location of the tile within the identified frame. In this way the client reference code 238 matches the information that was intrinsic to the encoding of the original tile. This means the client can use any storing and retrieval method for the cache tiles as long as it uses a consistent temporal and spatial translation method for storing and retrieving the image data.

As a next step 512 ("Reorder Hash Table"), tile states 220 in host hash cache 124 are re-ordered, for example, using an LRU sorting algorithm known to the art. In some embodiments, the most recent match is assigned the lowest index, which ensures efficient exponential coding in cases when an image comprises a run of identical pixel patterns. Method 500 then proceeds to step 416 of the method 400.

If, at step 502, it is determined that the tile hash value does not match any of the hash values in cache hash table 210 (i.e., if a cache miss occurs), or if, at step 503, it is determined that the input pixel values have not changed from frame to frame and have not been losslessly encoded (i.e., the same pixels are to be re-encoded at a higher quality level), method 500 proceeds to step 522 ("Encode Tile"). At step 522, the input tile is encoded for transmission using a suitable lossless or lossy encoding method known to the art. In some embodiments only some of the pixels in the tile are encoded at this step, for example when only some of the pixels in the tile have changed. In an embodiment, a tile comprises multiple blocks of pixels where each block is individually tracked, using block-specific encoder or decoder states (e.g., as described below with respects to FIGS. 13 and 14), for change, quality and sequencing so as to individually manage the encode state of each block of a tile. In other embodiments the individual encode management comprises pixel masking to further divide blocks of pixels. Pixel masking is useful when the visual image 122 can be divided, based on content, where different content would be encoded differently (e.g., when an edge of a video image does not align with a tile or block boundary used to encode the visual image and the image beside the video is not changing as in a window frame).

In an embodiment, step 522 includes progressive build encoding (e.g., JPEG 2000 progressive encoding) where a spatial tile with a constant image is transformed into the frequency domain and successive bit-planes of frequency domain coefficients are encoded and communicated during successive frame encodings. For example, the tile image is transformed into frequency domain using a Discrete Cosine Transform (DCT) or a Discrete Wavelet Transform (DWT) where the resulting frequency domain coefficients are scaled based on frequency and quantized by discarding high frequency resolution bit-planes. Progressive build then occurs by progressively adding back in successive bit-planes of the discarded high frequency resolution bit-planes. Such a technique requires the encoder 126 and decoder 142 to remain synchronized to know which bit-plane to encode and decode; generally the encoder 126 and the decoder 142 maintain such synchronization by each maintaining matching block states as described below with respect to FIGS. 13 and 14. In a remote desktop environment of the embodiment, dynamic changes to different portions of the image requires tile-specific build states to be maintained resulting in the tile states as described herein. In some embodiments, progressive build is used to build to a lossless reproduction of the source image (i.e., visual image 122), where in other embodiments progressive build stops at a selected quality level (or bit plane) and uses a spatial domain lossless residual encoder to complete the image communication to a lossless reproduction. Progressive build, or more accurately described as static source image progressive build, is not the same as changing source image progressive encoding (e.g., as used in MPEG encoding with P frames) where the difference between two similar images would be encoded. As progressive build is generally based on context based entropy encoding of successive bit planes of frequency domain data, each bit plane cannot be decoded without context knowledge of the previous bit planes. Thus progressive build only works if accurate state data is maintained. Similarly, cached images that are to continue progressive build after they are retrieved from a cache must be retrieved with the supporting state data.

In an embodiment, the encoder 126 and decoder 142 have a common configuration that minimizes unnecessary communications. The common configuration specifies an initial bit-plane quantizing level used for initial encoding, or decoding, of a block, or tile, of an image. During the encoding, the initial bit-plane quantizing level of an initial tile is stored in the host hash cache 124 as the tile quality 232. During the decoding, the initial bit-plane quantizing level is also stored in the client image cache 144 as the tile quality 262, along with a decoding of the quantized image as the tile pixel values 268. On a second frame encoding, where the initial tile hasn't changed, progressive build encoding is performed on the tile to communicate an additional bit-plane of frequency transformed data to the client computer 140 for decoding. The encoder 126 also records the new quantizing level as tile quality 232. The decoder 142 will update the output visual image 312 with the progressive build data and update the client tile state 260 to include updated pixel values 268 and tile quality 262. When a new tile at a different location of the source image generates a hash value the same as the above progressively built tile, the reference (i.e., client reference code 238) to the progressively built tile is sent to the decoder 142. The decoder 142 copies the tile pixel values 268 of the reference tile to a new tile location of the output visual image 312 and copies the associated client tile quality 262 for future decoding updates of the new tile. Then when the source image of the new tile remains constant and progressive build is implemented by the encoder 126, the progressive build can continue on from the previous quality state of the reference tile. In an example, a second bit plane of the frequency-transformed data is sent to the client computer 140 and assembled with the previous new tile data. In summary, each time a tile is referenced in a cache hit and copied to a tile of the output visual image 312, or some other frame buffer, a new independent copy of the data of the client tile state 260 is added to a frame buffer, including a copy of the tile pixel values 268, and associated with the newly updated tile. This effectively forms an independent branch in the progressive build decode that can continue to build even if the original source tile image is lost.

In some embodiments, the tile is divided into multiple blocks where each block maintains a separate quantizing level resulting in the tile state 230 and client tile state 260 having multiple independent block states.

In some embodiments. the bit-plane quantizing may be frequency dependent bit-planes and/or color space elements for finer resolution of progressive build. In other embodiments, progressive build in the frequency domain may be replaced with spatial domain sub-sampling and/or quantizing and/or residuals.

In general, tiles that have at least one changed pixel and have a tile hash value not found in host hash cache 124 are encoded at an initial encode. In an embodiment, initial encoding means encoding pixel values without reference to previous pixel values, as in an initial (I) frame in video encoding. Initial encoding may still have inter-tile dependencies as would be seen using an entropy encoder (e.g., context-adaptive binary arithmetic coding (CABAC)) on a number of tiles. In alternative embodiments, initial encoding may include non-exact matched references with or without a refinement addition. In other embodiments, initial encoding includes determining the type of image and associated image encoder (e.g., performing the initial encoding of a progressive build encoding).

As a next step 524, host hash cache 124 is updated with the tile hash value and state of the input pixels associated with the tile (or section thereof) encoded at step 522. In various embodiments, the tile hash value is assigned an early position such as the lowest index in the host hash cache 124, the highest entry in the host hash cache 124 is purged, and an LRU algorithm is applied to sort the remaining hash values. In another embodiment, statistics related to the visual image 122 are maintained and the replacement table location is modified to increase the probability of a cache hit. Method 500 then returns to step 416 of the method 400.

Figure 10:
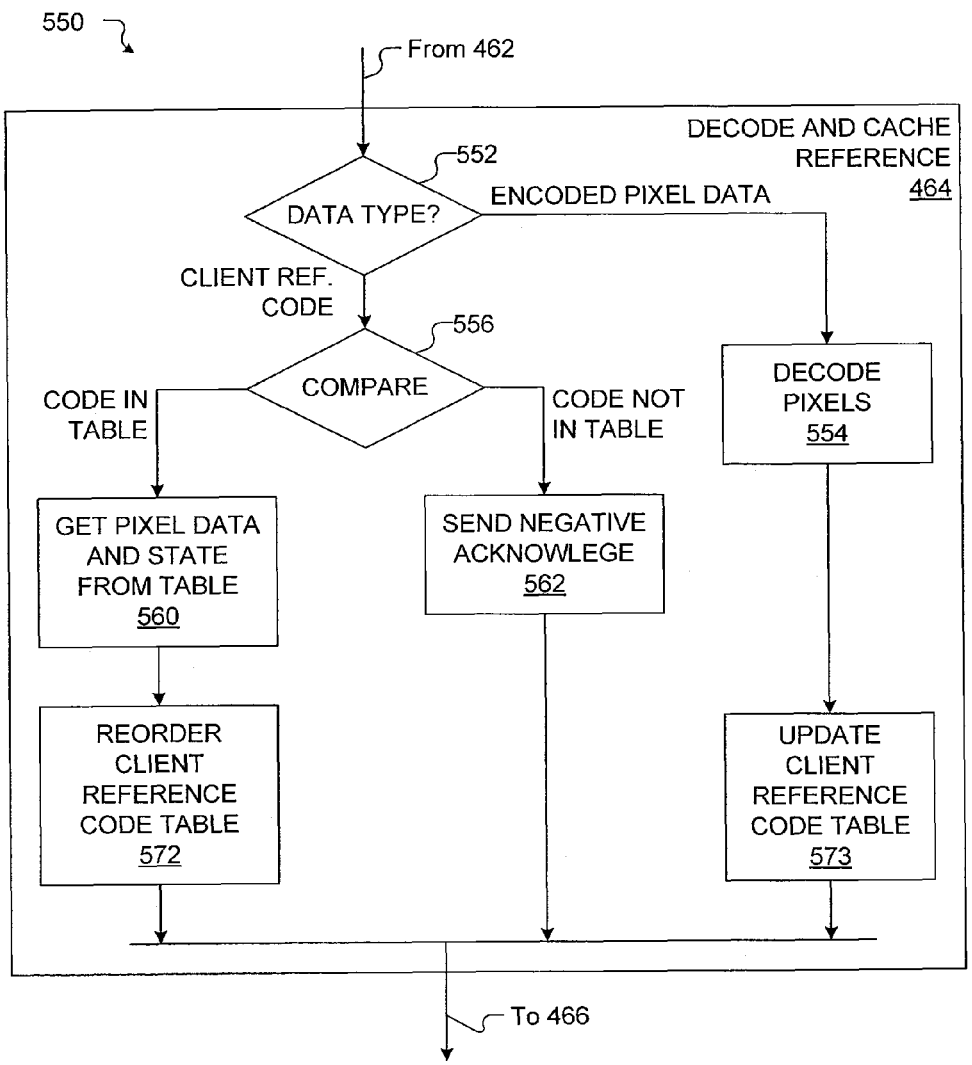
FIG. 10 is a block diagrams of a method for decoding a tile in accordance with one or more embodiments of the present invention.

FIG. 10 is a block diagram of a method 550 for decoding encoded pixel data and referencing client reference codes in the client image cache 144. The method 550 illustrates an embodiment of step 464 in FIG. 8 ("Decode and Cache Reference"). Method 550 starts, subsequent to step 462 of the method 450, at step 552 ("Data Type?"), where the received encoding is examined to see if it comprises encoded pixel data or a reference to the client image cache table 144 (e.g., an encoding of a client reference code 238). In an embodiment, sequencing and other information in the packets will indicate which tile of the image is being processed and if un-encoded tiles are to be skipped over.

If, at step 552, it is determined that the encoded data comprises lossy or lossless encoded image data, the method proceeds to step 554 ("Decode Pixels"). At step 554, the encoded pixel data is decoded to a set of pixel values using a complementary lossy or lossless image decoder. The decoded pixel values are then used to update the output visual image 312. In an embodiment, lossy or lossless encoded image data comprises progressive, refinement or replacement encodings in any combination for parts or all of a tile.

As a next step 573, the list of client reference codes 240 is updated with a client reference code value (e.g., Code0 242) and associated tile pixel values 268 are updated with the decoded set of pixel values. In an embodiment, the client reference code value is generated from the temporal and spatial information of the tile obtained from the decoding at step 554, where such temporal and spatial information is intrinsically communicated as part of the encoding sequence of an image. In various embodiments, the client reference code value is assigned an early position in the list of client reference codes 240 (such as the lowest index in the list of client reference codes 240), the highest entry in the client image cache 144 is purged, and an LRU algorithm is applied to sort the remaining client reference codes 240 and associated client tile states 250 In general, the purging algorithm of the client image cache 144 is identical to the purging algorithm of the host hash cache 124 so the two caches remain synchronized. In an embodiment where the decoding is determined to be a refinement of a cached tile, the corresponding client tiles states 250, including the tile pixel values 268, are updated and list sorting is performed to match symmetric encoding operations by the host computer 110. In another embodiment, statistics related to the input tiles are maintained and the replacement table location is modified to increase the probability of a cache hit. Method 550 then returns to step 466 of the method 450.

If, at step 552, it is determined that the encoded data represents an encoding of a client reference code 238 for comparison to the client cache 144, the method 500 proceeds to step 556 ("Compare").

In step 556 the received client reference code 238 is compared against the list of client reference codes 240 to find a possible matching client reference code.

If, at step 556, a matching client reference code is found in the list of client reference codes 240 of client image cache 144, the method 550 proceeds to step 560. In step 560, the tile pixel values 268 and additional information associated with the client tile state 260 corresponding to the matched client reference code are retrieved from the client image cache 144 and used to update the output visual image 312. Method 550 then proceeds to step 572 to reorder the client image cache 144 as previously described and then returns to step 466 of the method 450.

If, at step 556, a matching client reference code is not found in the list of client reference codes 240 of client image cache 144, method 550 proceeds to "send negative acknowledge" step 562 where the remote client computer 140 signals a cache miss by sending an image cache negative acknowledgement message to the host computer 110 that identifies the unmatched received client reference code. Method 550 then returns to step 466 of the method 450. In an embodiment, a cache miss is a result of a minor synchronization error between the host hash cache 124 and the client image cache 144. The cache miss does not mean accompanying encoded pixel data, from a previous or subsequent pass of decode and compare client codes 464, is in error and does not interfere with "decode pixels" step 554 or "update client reference code table" step 573. A recode of an image section that includes both cache-missed tiles and decoded pixel tiles can reference the decoded pixel tiles as cached images, thereby reducing the bandwidth needed to retransmit the image section. In one such embodiment, if the cache miss is detected, the decoded pixel values determined in "decode pixel" step 554 are not displayed as the cache miss would introduce a visible tear in the displayed image. Then, when the host 110 receives the cache miss indication, the entire corresponding image section is recoded using the cached images of the previously successfully communicated decoded and cached pixels.

In some embodiments, "end of display" step 466 may determine that an error (e.g., client reference code 238 was not found) occurred in the decoding and the only part of the encoded image data has been successfully decoded. To prevent display tearing, caused by partial updates to a frame, the "end of display" step 466 may delay "refresh display" step 468, by looping back to "receive encoding" step 462, to obtain corrective encodings. At this time, the corrective encodings can reference the updated client image cache 144 to obtain successful parts of the previous decoding, thus reducing the bandwidth needed to retransmit images with unmatched client reference codes 238.

In general, the negative acknowledgement is used when the host hash cache 124 become unsynchronized with the client image cache 144. This loss of synchronization may occur as a result of a lost packet when using unreliable communications, such as UDP/IP. While the negative acknowledgment resynchronization method will introduce some delay, the reduced latency of usually not having to wait for acknowledgement before referencing a cached image improves compression and generally improves image quality and reduces overall latency. In general, while the image communication system, including the caching, uses unreliable sequenced datagrams to minimize latency and then uses negative acknowledgement for quick response to missing or invalid encoded content, the system also includes a positive acknowledgement system. The positive acknowledgment system is not time critical and is used to track which encoded content and related images have been successfully communicated and/or decoded. Then when a communication error occurs, such as a time-out or some types of negative acknowledgements to a part of the encoded image stream, the system can recover by reverting to known good content to reconstruct the decoded image at the client computer 140 with minimal retransmission. Images that would be decoded for display as well as cached in the client image cache 144 are covered by this positive acknowledgement. However, cached image still require the negative acknowledgement to, first, allow cached content to be reference prior to receiving the slower response positive acknowledgement and, second, to account for misalignment of cache image discards between the host computer 110 and client computer 140. These cache discard misalignments can result from latency difference between host computer 110 and client computer 140 when determining which cached item to discard to free up cache space (e.g., LRU algorithm).

Figure 11:
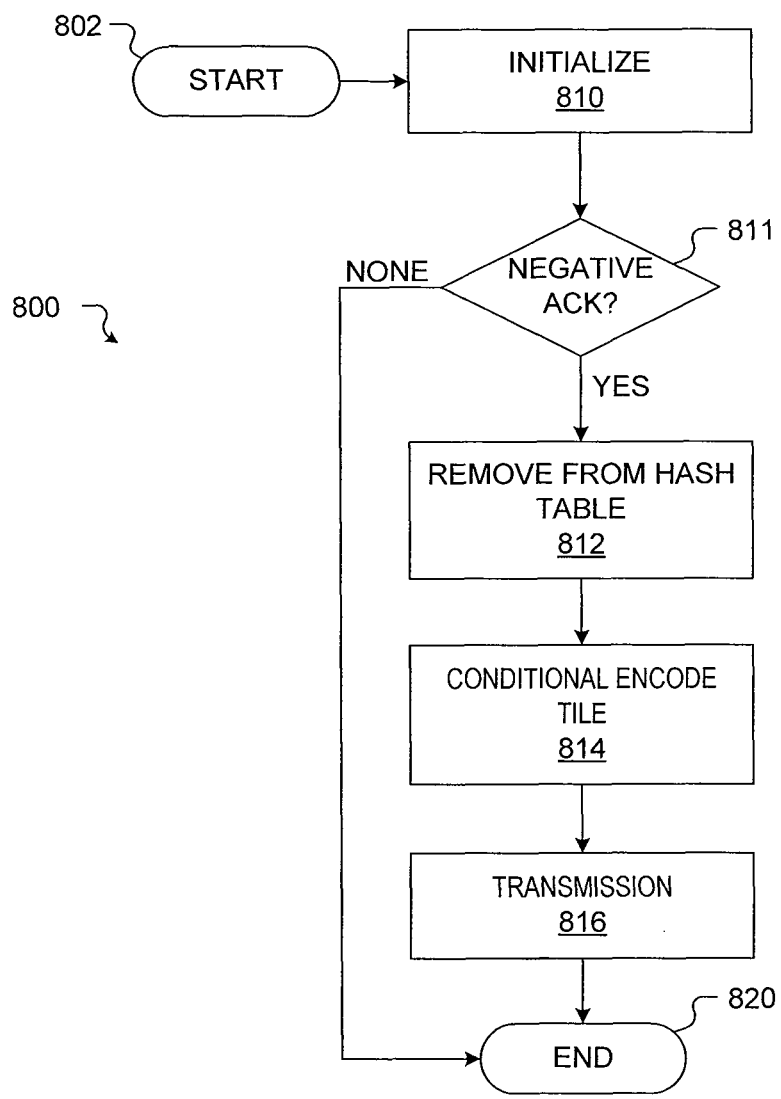
FIG. 11 is a block diagrams of a method for updating a host hash cache in accordance with one or more embodiments of the present invention.

FIG. 11 is a block diagram of a method 800 (executed by host computer 110) illustrating an embodiment of processing negative acknowledgements generated by the remote client computer 140 (ref. step 562 of method 550). Method 800 starts at step 802 ("Start") upon receiving an image decode status packet from remote client computer 140 over network 130. In an embodiment, the packet is received using a protocol known in the art such as UDP/IP. In some embodiments, if the image decode status packet is lost, a higher level transport method is used to determine successful or unsuccessful communications of image slices or portions as would be known in the art and is not detailed here.

Method 800 then proceeds to step 810 ("Initialize"). In step 810, method 800 synchronizes with encoding and transmitting method 400. Synchronization is required as both method 800 and method 400 read and modify host hash cache 124. Synchronization may be performed by ensuring only one of the two methods is active at a time. Method 800 then proceeds to step 811 ("Negative Ack?"). In step 811 it is determined if the received decode status packet contains an image cache negative acknowledgement message.

If, at step 811, the received packet comprises an image cache negative acknowledgement, method 800 proceeds to step 812 ("Remove from Hash Table") in which the tile identified by the client reference code in the negative acknowledgement message is removed from host hash cache 124 and method 800 proceeds to step 814 ("Conditional Encode Tile") which performs functions of step 414 of method 500. Method 800 then proceeds to step 816 ("Transmission") which performs functions of step 416 of method 500. In an alternate embodiment, the recoding and transmission may be performed as part of a recoding of an entire image section, thus skipping steps 814 and 816 and replacing them with a recoding which will perform steps 414 and 416.

Method 800 then ends at step 820. As described previously, in some embodiments tiles are grouped together in slices where decoded tile updates require synchronization to prevent tearing of the displayed image. In such embodiments, recoded tiles may be combined with successfully encoded tiles as describe above.

If, at step 811, the received packet does not contain an image cache negative acknowledgement, method 800 ends at step 820.

In other embodiments, other image decode status packets are synchronized with the encoding and transmitting method 400 or negative acknowledgment processing method 800 before performing other update or corrective image transmissions.

FIG. 12 illustrates select details of host computer 610, an alternative embodiment of host computer 110. Generally, host computer 610 is differentiated from host computer 110 by co-processing capabilities that offload at least part of the encoding function (ref. encoder 126) from the primary processor (ref. processor system 112).

Host computer 610 comprises processor system 640. Processor system 640 is supported by support circuits 614; support circuits 614 are similar to support circuits 114. Processor system 640 comprises CPU and chipset 642 coupled to encoder module 644 by a bus 646, such as a PCI-EXPRESS bus, a HYPERTRANSPORT bus, an image data bus (such as a DISPLAYPORT bus, a Digital Visual Interface (DVI) bus, or a USB bus), or a combination thereof. CPU and chipset 642 may comprise processor components as described for processor system 112. CPU and chipset 642 is attached to memory 620, which is structurally similar to memory 120. Memory 620 comprises visual image 622, which is substantially similar to visual image 122. Host computer 610 further comprises encoder memory 630, which comprises host hash cache 632. Host hash cache 632 is structurally similar to host hash cache 124; however, in an embodiment, unlike host hash cache 124, host hash cache 632 is located in encoder memory 630 independent of primary CPU memory 620. In an embodiment, encoder memory 630 comprises any one or combination of volatile computer readable media (e.g., random access memory (RAM), such as DRAM, SRAM, XDR RAM, DDR RAM, and the like) and nonvolatile computer readable media (e.g., ROM, hard drive, tape, CDROM, DVDROM, magneto-optical disks, EPROM, EEPROM, Flash EPROM, and the like).

In another embodiment, host hash cache 632 is stored in memory 620 and is used by the CPU to generate motion vectors. These motion vectors as passed to the encoder module 644, which maintains previously encoded images in encoder memory 630. The encoder uses the motion vectors to encode the visual image by comparing the previously encoded images offset by the motion vector with the visual image.

In an embodiment, encoder module 644 comprises a Field Programmable Gate Array (FPGA), Application Specific Integrated Circuit, System-on-Chip (SoC) device with image processing resources, at least part of a GPU or media processor (such a decision-oriented imaging pipeline), and low latency memory configured, at least in part, to execute the encoding functions provided by encoder module 644. In some embodiments, encoder module 644 comprises parallel processing structures, each structure comprising computation elements, memory, and a shared or independent color index table that enables simultaneous encoding of multiple blocks of visual image 622. Encoder module 644 is coupled to network interface 616 which provides network connectivity functions substantially similar to those of network interface 116. Alternatively, encoded data from module 644 is looped back to CPU and chipset 642 and transmitted to the remote client computer 140 using a network interface under management of CPU and chipset 642.

FIG. 13 is a block diagram of the host computer memory 120 in accordance with one or more embodiments of the present invention. As previously described, the memory 120 comprises the visual image 122, the host hash cache 124 (comprising the cache hash table 210 and tile states 220), and the encoder 126.

The encoder 126 comprises a state-dependent encoder 1300 for compressing the visual image 122, and a list of host block states 1302 comprising a plurality block states (e.g., block state 1304), where each block state is associated with an image block. As previously described, the encoder 126 and the decoder 142 may divide an image frame into a number of spatially-partitioned blocks; in some embodiments, a plurality of blocks may form a tile. For each block, a matching encoding/decoding block states may be maintained at the encoder 126/decoder 142, respectively, where the state for each block is independent of other blocks of the image frame.

When a block of an image changes, it is encoded to an initial state and an associated block state (which identifies the initial encoding state) is maintained within host block states 1302 of the encoder 126. At the same time, a hash value corresponding to a tile containing the block is entered into the host hash cache 124 along with a tile state, which includes a copy of the block state (e.g., the block state is copied to tile quality 232, delay state 234 and lossless state 236). In an example where a tile is 32×32 pixels and a block is 16×16 pixels, a tile state 226 will include four block states like block state 1304. Thus, in this example, a tile quality 232 will have four quality values associated with the four blocks. As long as each block state 1304 is saved and retrieved from the cache in the same fashion, the primary purpose of the cached tile states can be achieved, which is to allow the encoder and decoder to remain synchronized after a cache hit is encoded an decoded. If, following a previous encoding, an image block is unchanged, the associated block state is examined to determine if it needs to build, for example, to a higher quality level; in some embodiments, unchanged blocks that have not been encoded to a lossless state are selected for encoding based on their block state (within host block states 1302) indicating a refinement or lossless encode or recode requirement. If the unchanged image block is re-encoded, its associated block state is updated to reflect the new encoding (e.g., the new quality level), and the updated block state is also copied to the host hash cache 124, for example to the corresponding tile quality 232, delay state 234 and lossless state 236.

In an embodiment, each time the tile quality 232, delay state 234 and lossless state 236 are updated, the associated client reference code 238 is updated to identify the new temporal information (e.g. a new frame sequence number).

When the contents of a previously-seen tile (which may include multiple blocks) are seen again in a different tile, i.e., at different spatial or temporal location within the image stream, the encoder 126 may use the client reference code 238 to reference tile state 230 associated with the previously-seen tile, and the encoder 126 may then copy the tile quality 232 for the previously-seen tile into the block state(s) of the new tile.

As further described below, the decoder 142 maintains a list of block states that correspond to those of the encoder 126 in order to maintain synchronization between the encoder 126 and the decoder 142 with respect to block change, quality, and sequencing.

One knowledgeable in the art would recognize that tile states 220 refer to the state of the images stored in the client image 144, where the tile is sometimes referred to as an image tile, i.e., tying the state to the image. Host block states 1302 or equivalent host tile size states are tied to the spatially partitioned portion of the frame buffer, which has changing images. This frame buffer block or tile is sometimes referred to as a spatial block or spatial tile.

Figure 14:
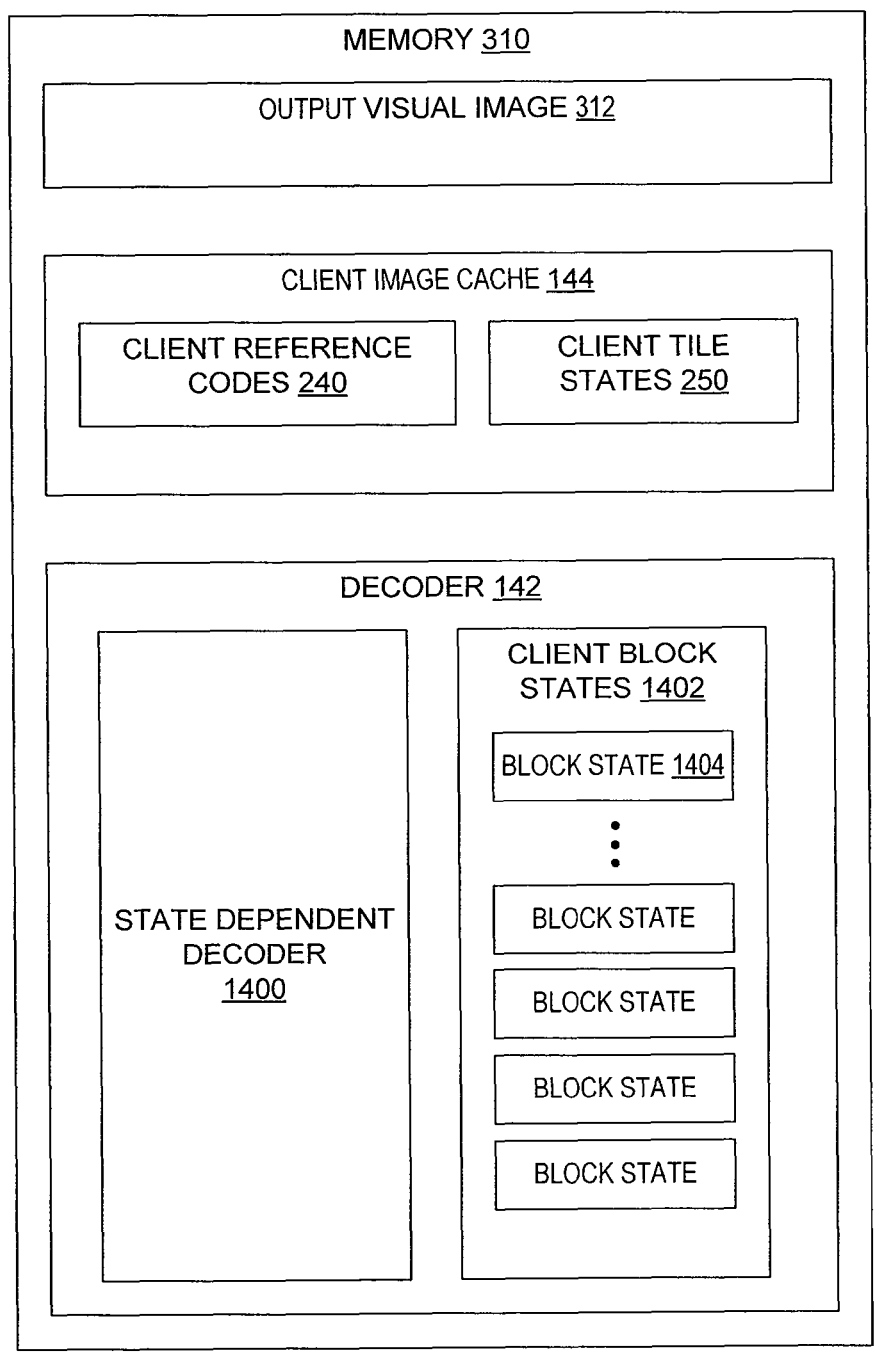
FIG. 14 is a block diagram of the client computer memory in accordance with one or more embodiments of the present invention.

FIG. 14 is a block diagram of the client computer memory 310 in accordance with one or more embodiments of the present invention. As previously described, the memory 310 comprises the output visual image 312, the client image cache 144 (comprising the client reference codes 240 and client tile states 250), and the decoder 142.

The decoder 142 comprises a state-dependent decoder 1400 for decoding encoded data received from the host computer 110 to generate the output visual image 312. The decoder 142 also comprises a list of client block states 1402 comprising a plurality block states (e.g., block state 1404), where each block state is associated with an image block transmitted from the host computer 110. Each block received by the client computer 140 has an associated block state within the client block states 1402 that matches the corresponding block state within the host block states 1302, thereby maintaining synchronization between the encoder 126 and the decoder 142 with respect to block change, quality, and sequencing.

During decoding at the client computer 140, the "decode pixels" step 554 of the method 550 results in the output visual image 312 and its associated client block states 1402 being updated. The pixel values of the output visual image 312 and the associated client block states 1404 are then used to update the corresponding client tiles states 250. During decoding at the client computer 140, the "get pixel data and state from table" step 560 of the method 550 results in the tile pixel values 268 being copied to the output visual image 312 and the tile quality 262, delay state 264 and lossless state 266 are copied to the associated block states of client block states 1402.

As with the host computer 110, in the client computer 140 a tile described by the client image cache 144 is sometimes referred to as an image tile, where a block or tile in the client frame buffer is referred to as a spatial block or spatial tile. Typically this is not required but is used where there may be confusion between the type of tile or block.

While the foregoing primarily describes how an image stream may be encoded using caching to reduce communication bandwidth, it would be obvious to those skilled in the art that multiple image streams or an image stream supporting multiple displays could share a common host hash cache 124 and a common client image cache 144. In another embodiment, as long as the host hash cache 124 and the client image cache 144 are separated by the network 130, where the image communication bandwidth over the network 130 needs to be reduced, multiple encoders, like encoder 126, could share a common host hash cache, like host hash cache 124, and multiple decoders, like decoder 142, could share a common client image cache, like client image cache 144. Adjustments to the cache discard algorithm would be used to ensure each encoder/decoder pair obtained an appropriate share of the caching resources. Once again the generation and processing of negative acknowledgements (FIG. 11) would handle cache synchronization errors between the multiple encoders and decoders including the error resulting from multiple encoders (or decoders) sharing a cache. It would also be obvious that a shared cache need not be part of the same computer as the encoder or decoder as long as there was an appropriate high bandwidth and low latency connection to the cache.

While the foregoing is directed to embodiments of the present invention, other and further embodiments of the invention may be devised without departing from the basic scope thereof, and the scope thereof is determined by the claims that follow.

The invention claimed is:

1. A method of communicating image data during a remote computing session to a client using an unreliable transport protocol, comprising:

transmitting to the client, by a computer comprising at least one processor, (i) an initial encoding of a first image instance of a first spatial tile in a first frame of a sequence of image frames followed by (ii) an initial encoding of a second image instance of the first spatial tile in a second frame of the sequence and subsequent to the first frame, the image of the first spatial tile changed between the first image instance and the second image instance;

transmitting to the client, by the computer, an encoding indicative of a perfect match between pixel values of a first image instance of a second spatial tile, in a third frame of the sequence and subsequent to the second frame, and the first image instance of the first spatial tile; and receiving, by the computer, a cache miss from the client indicating an absence of a decoding of the encoding of the first image instance of the first spatial tile, the absence identifying a synchronization error between image tiles cached at the client and information at the computer identifying available image tiles at the client; and transmitting, in response to the indication of the absence, an initial encoding of a second image instance of the second spatial tile to the client.

2. The method of claim 1, wherein an initial encoding of any image of a spatial tile in the sequence comprises encoding pixel values of the any image in absence of a reference image.

3. The method of claim 1, further comprising transmitting, by the computer, (a) an encoding of a first image instance of a third spatial tile as an indication of a lossless match to pixel values of the first image instance of the first spatial tile, followed by (b) encoding a quality improvement encoding, of the first image instance of the third spatial tile, only decodable with a build state of a decoding of the encoding of the first image instance of the first spatial tile.

4. The method of claim 1, wherein the first spatial tile and the second spatial tile each comprise a consistent spatial selection of pixels over the sequence of image frames, and wherein the first spatial tile and the second spatial tile have common pixel dimensions.

5. The method of claim 1, wherein an unreliable Internet transport protocol is used when transmitting the encoding indicative of the perfect match.

6. The method of claim 1 further comprising generating the sequence of image frames in response to a human input device event received from a client computer via an Internet Protocol (IP) network, and wherein the initial encodings and the encoding indicative of the perfect match are transmitted to the client computer via the IP network.

7. The method of claim 1, wherein transmitting the encoding indicative of the perfect match is preceded by receiving an acknowledgement of a successful decode of both the initial encoding of the first instance and the second instances of the first tile.

8. A method of communicating image data during a remote computing session to a host computer using an unreliable transport protocol, comprising:
  receiving, from the host computer, by a client computer comprising at least one processor, a first update to an image that comprises a first the and a second tile;
  decoding the first update by (i) storing a decoding of the first tile in an image cache and (ii) detecting a cache miss indicating an absence of a reference in the image cache when decoding the second tile, wherein the absence identifies a synchronization error between image tiles cached at the client and information at the host computer identifying available image tiles at the client;
  transmitting, to the host computer, an indication of (i) the decoding of the first tile and (ii) the cache miss in response to detection of the cache miss;
  receiving, by the client computer from the host computer, a second update to the image; and
  decoding the second update, wherein decoding the second update comprises (i) copying the decoding of the first tile from the image cache to a display image, (ii) decoding an initial encoding of a replacement for the second tile and (iii) copying the decoding of an initial encoding to the display image.

9. The method of claim 8 wherein the display image is displayed by the client computer, and wherein copying the decoding of the first tile to the display image comprises synchronizing a display of the decoding of the first tile with a display of the decoding of the initial encoding of the second tile.

10. The method of claim 8, wherein decoding the first update comprises decoding pixel values of the first tile in absence of reference pixel values.

11. The method of claim 8, wherein receiving the first update and the second update comprises receiving a plurality of Internet User Datagram Protocol (UDP/IP) packets from a host computer.

12. The method of claim 11, further comprising:
  generating, by the host computer, a source image for the image in response to a human input event from a peripheral device of the client computer, wherein generating the source image comprises generating the first and the second updates; and
  transmitting, by the host computer, the first and the second updates to the client computer.

13. The method of claim 12, wherein transmitting the second update to the image is in response to receiving the indication of the cache miss from the client computer.

14. An apparatus for encoding an image sequence comprising:
  a tile encode state dependent encoder, coupled to a memory of the apparatus, wherein the tile encode state dependent encoder:
    detects, for a hash value generated from a changed tile of an image frame being encoded, a matching hash value within a plurality of hash values, stored in the memory, each generated from a corresponding image tile of a plurality of image tiles, wherein the plurality of image tiles are of a plurality of previously encoded image frame tiles from a sequence of image frames;
    encodes the changed tile, based on the matching hash value, as a copy of an image tile of the plurality of image tiles; and
    encodes, for a subsequent frame to the image frame, a constant image update to the changed tile as a quality improvement using the constant image of the changed tile and a tile encode state associated with the image tile.

15. The apparatus of 14, wherein the memory further comprises a plurality of cache tile states, each cache tile state of the plurality of cache tile states associated with one of the plurality of hash values, wherein one of the plurality of cache tile states comprises the copy of the tile encode state, and wherein (i) each image tile of the plurality of image tiles comprises an image of one of the plurality of tiles of a frame of the plurality of previously encoded image frames and (ii) the copy of the tile encode state comprises a state of a state-dependent encode sequence.

* * * * *